United States Patent [19]
Komatsu et al.

[11] Patent Number: 5,835,676
[45] Date of Patent: Nov. 10, 1998

[54] MOTOR DRIVING APPARATUS

[75] Inventors: Yoshiaki Komatsu, Yokkaichi; Motoaki Yamanashi, Nagoya, both of Japan

[73] Assignee: Brother Kogyo Kabushiki Kaisha, Nagoya, Japan

[21] Appl. No.: 415,737

[22] Filed: Apr. 3, 1995

[30] Foreign Application Priority Data

Apr. 6, 1994 [JP] Japan .................................. 6-068608
Jul. 20, 1994 [JP] Japan .................................. 6-168111

[51] Int. Cl.$^6$ ...................................................... E02D 5/28
[52] U.S. Cl. ........................... 388/811; 318/245; 388/920
[58] Field of Search .................................. 388/809–815, 388/920; 318/798, 245, 254, 439

[56] References Cited

U.S. PATENT DOCUMENTS

| | | | |
|---|---|---|---|
| 3,710,213 | 1/1973 | Hansen | 388/811 |
| 3,984,753 | 10/1976 | Uchida et al. | 321/47 |
| 4,201,936 | 5/1980 | Roumanis | 388/811 |
| 4,556,827 | 12/1985 | Erdman | 318/254 |
| 4,562,549 | 12/1985 | Tanaka et al. | 388/811 X |
| 4,622,500 | 11/1986 | Budelman | 388/811 |
| 4,739,230 | 4/1988 | Sonobe et al. | 318/636 |
| 4,897,778 | 1/1990 | Miyamoto et al. | 388/811 |
| 5,029,229 | 7/1991 | Nelson | 388/811 |

Primary Examiner—David S. Martin
Attorney, Agent, or Firm—Oliff & Berridge, PLC

[57] ABSTRACT

An apparatus for driving an electric motor, including a full-wave rectifier which rectifies an alternating current supplied from an alternating-current power supply, and supplies a full-wave rectified current to the motor, a chopper which chops the full-wave rectified current supplied from the rectifier to the motor so that the chopped current is applied to the motor, and a control device which generates a chopping pulse signal having a first signal characteristic corresponding to a given motor control target and a second signal characteristic to reduce an alternating-current component of the full-wave rectified current supplied to the motor, the control device supplying the chopping pulse signal to the chopper so that the chopper chops the full-wave rectified current according to the chopping pulse signal.

103 Claims, 22 Drawing Sheets

INTERRUPT HANDLER 1

INTERRUPT HANDLER 2

VOLTAGE SUPPLIED TO MOTOR 133

MOTOR DRIVING APPARATUS

BACKGROUND OF THE INVENTION

1. Field of the Invention

The present invention relates to an apparatus for driving an electric motor according to a given motor control target.

2. Related Art Statement

A sewing machine performs a sewing operation by converting rotary motion of an electric motor into vertical motion of a needle bar to which a sewing needle is secured, vertical motion of an upper(needle)-thread take-up lever with different timing than that of the vertical motion of the needle bar, rotary rotation of a shuttle in which a lower thread is accommodated, X-Y feeding of a work sheet such as a cloth or leather relative to the needle (or needle bar), etc. The electric motor employed in the sewing machine is, e.g., a universal motor. FIG. 19 shows a driving apparatus for driving a universal motor. A driving apparatus employed in a sewing machine is an example of the motor driving apparatus to which the present invention relates.

As shown in FIG. 19, a universal motor (M) 4 is connected to a commercially available AC (alternating current) power supply 1 via a noise-removing circuit 2 and a solid-state relay (SSR) 3. Each of the rotor and stator of the universal motor 4 is formed of a coil. The AC source voltage of the AC power supply 1 is directly applied to the universal motor 4, so that the rotor of the motor 4 rotates in one direction irrespective of the changing of flow directions of the electric current flowing through the motor 4. FIG. 20(A) shows a waveform of the AC source voltage of the AC power supply 1.

A central processing unit (CPU) 5 is connected to the solid-state relay 3. A target-speed input device 6 and a rotary encoder 7 are connected to the CPU 5. The target-speed input device 6 is manually operable by an operator or user to input or preset a desired target rotation speed of the universal motor 4. The encoder 7 detects an actual rotation speed of the motor 4. The CPU 5 compares the actual motor speed detected by the encoder 7, with the target motor speed preset through the target-speed input device 6, and produces a control command signal based on the comparison result. The CPU 5 utilizes the control command signal for determining a timing for supplying an ON signal to the solid-state relay 3. FIG. 20(B) shows the ON signals which the CPU 5 supplies to the relay 3. Upon reception of each ON signal, the relay 3 permits a portion of the voltage waveform of the AC supply 1 shown in FIG. 20(A) to pass through the relay 3 to the universal motor 4, so as to rotate the motor 4. This "portion" of the AC voltage waveform starts with a phase angle upon reception of each ON signal and ends with the following zero crossing.

The CPU 5 modifies the control command signal and changes the timing for supplying the ON signal so that the actual motor speed detected by the encoder 7 gradually approaches the target motor speed preset via the target-speed input device 6. For example, in the case where the actual motor speed measured by the encoder 7 is lower than the target motor speed input through the target-speed input device 6, the CPU 5 shifts the timing for supplying the ON signal to the relay 3, leftward as seen in FIG. 20(B), that is, generates an ON signal at a shorter interval from the previous ON signal. Consequently a greater portion of the AC voltage waveform is supplied to the universal motor 4, so that the rotation speed of the motor 4 is accelerated.

The voltage waveform of the AC supply 1 shown in FIG. 20(A) oscillates at 50 Hz or 60 Hz, therefore the rotation speed of the universal motor 4 changes at a frequency of 100 Hz or 120 Hz as shown in FIG. 20(B) or FIG. 20(C). FIG. 20(D) shows a waveform of an electric current flowing through the motor 4. Meanwhile, the output torque of a DC (direct current) motor changes in proportion to the magnitude of electric current flowing through the DC motor. In particular, the output torque of a universal motor 4 changes in proportion to the square of electric current flowing therethrough. FIG. 20(E) shows the change of output torque, Γ, of the universal motor 4 with respect to time, t.

However, the conventional motor driving apparatus arranged as described above suffers from the problems that the universal motor 4 intermittently generates output torque peaks Γ as shown in FIG. 20(E) and that the respective maximum values of the intermittent output torque peaks Γ are not constant or uniform. Consequently the motor 4 produces vibration having a frequency of 100 Hz or 120 Hz. This vibration of the motor 4 causes discomfort vibration of the framework of the sewing machine which in turn is transmitted to the operator or user. Additionally, since the 100 Hz or 120 Hz vibration falls within the human audible sound range, the operator or user cannot avoid hearing discomfort low-tone noise resulting from that vibration. A test shows that a home-use or domestic portable sewing machine produces noise as high as 57 dB when a universal motor employed therein is rotated at 110 rpm (rotations per minute).

In this background, it may be considered that the above problems may possibly be solved by driving the universal motor 4 with a direct current supplied from an exclusive DC power supply. However, a considerably large DC power supply is needed for driving a universal motor, which results in increasing the production cost of the driving apparatus. In addition, it may be required that a heavy and bulky element such as a transformer be incorporated into the driving apparatus. Thus, the sewing machine employing the driving apparatus will not satisfy commercial requirements on either size or price.

The inventors of the present U.S. patent application developed a motor driving apparatus which does not employ an exclusive DC power supply. This driving apparatus is shown in FIGS. 21 and 22 (this apparatus was not known in the art before filing of the Japanese patent applications from which the present U.S. application claims priority).

As shown in FIG. 21, the motor driving apparatus includes a full-wave rectifying circuit 8 for full-wave rectifying the AC output of a commercial AC power supply 1. The full-wave rectified output (FIG. 23(A)) of the rectifying circuit 8 is supplied to a universal motor 4, and a switching element 9 chops the full-wave rectified output being supplied to the motor 4. The switching element 9 is provided by, e.g., a transistor such as FET (field effect transistor) or IGBT (insulated gate bipolar transistor).

The switching element 9 is selectively placed in an ON or OFF state thereof by a control device 10 via a pulse-signal generating circuit 11. The control device 10 receives a source-voltage synchronous signal (FIG. 23(B)) generated by a source-voltage synchronous signal generating circuit 12 which is connected to one of output terminals of the full-wave rectifying circuit 8. The source-voltage synchronous signal generating circuit 12 generates a source-voltage synchronous signal when the full-wave rectified output of the rectifying circuit 8 crosses the zero volt (0 V) level as shown in FIG. 23(A).

The control device 10 and the pulse-signal generating circuit 11 are provided by a one-chip microcomputer 13.

FIG. 22 shows an electronic construction of the one-chip microcomputer 13. As shown in FIG. 22, the one-chip microcomputer 13 includes a central processing unit (CPU) 14, a random access memory (RAM) 15, a read only memory (ROM) 16, an input and output (I/O) port 17, a first timer 18, a second timer 19, an inverter 20, and an interrupt controller 21. In this case, the control device 10 is provided by the CPU 14, RAM 15, ROM 16, I/O port 17, and interrupt controller 21, and the pulse-signal generating circuit 11 is provided by the first and second timers 18 and, 19 and the inverter 20.

When the source-voltage synchronous signal generated by the source-voltage synchronous signal generating circuit 12 is input to an interrupt-request terminal, INT1, of the interrupt controller 21, the control device 10 is started to calculate a motor control target value (e.g., reference pulse width, W0) and temporarily store the calculated control value in the RAM 15. The control device 10 may be of a well-known proportional-control, adaptive-control, or fuzzy-control type. The pulse-signal generating circuit 11 generates a pulse signal having the reference width W0, at a prescribed frequency or period, so that the pulse signal is supplied to the switching element 9 to selectively place the element 9 in the ON or OFF state.

More specifically, the first timer 18 is a rate generator which generates a pulse signal at a prescribed frequency or period as shown in FIG. 23(C). The second timer 19 is a retriggerable one-shot generator which is triggered at the leading edge of each high-voltage-state pulse signal (i.e., trigger signal) from the first timer 18, to generate an inverted pulse signal having a low-voltage-state length, d, as shown in FIG. 23(D).

The low-voltage-state length d of the pulse signal generated from the second timer 19 corresponds to the reference pulse width W0 calculated as the motor control value by the control device 10. Each time the control device 10 calculates a motor control value W0, i.e., when each low-voltage state of a synchronous signal shown in FIG. 23(E) is generated in synchronism with the source voltage of the AC supply 1, a length d corresponding to the control value W0 is written in the second timer 19 via the I/O port 17. Subsequently, when a trigger signal is input to the second timer 19, the second timer 19 generates an inverted pulse signal having the written length d. When the second timer 19 is supplied with a plurality of trigger signals after receiving a length d1 and before receiving another length d2, the second timer 19 generates corresponding pulses each having the same low-voltage-state length d1. The inverter 20 inverts an inverted pulse signal generated by the second timer 19, so that the twice-inverted signal is supplied to the switching element 9 to carry out the ON-OFF control of the element 9. Consequently a voltage waveform indicated at solid line in FIG. 24 is supplied to the universal motor 4.

The above-described motor driving apparatus can apply a high frequency-switched (or -chopped) voltage waveform to the universal motor 4, in the case where the chopping signal used to carry out the ON-OFF control of the switching element 9, i.e. pulse signal generated by the second timer 19 has a high frequency. In this case, the universal motor 4 outputs a continuous torque, thereby largely reducing the vibration and noise produced during the operation of the motor 4.

However, the voltage waveform supplied to the universal motor 4 contains a sine-curve voltage component as indicated at broken line in FIG. 24. Therefore, an electric current having a sine-curve component, i.e., AC characteristic flows through the motor 4, so that the output torque of the motor 4 changes at a period or frequency of, e.g., 100 Hz or 120 Hz. Consequently the rotation speed of the motor 4 changes or oscillates at a frequency of 100 Hz or 120 Hz, a further disadvantage to be eliminated.

SUMMARY OF THE INVENTION

It is therefore an object of the present invention to provide a driving apparatus for driving an electric motor, which apparatus does not employ an exclusive DC power supply, which largely reduces discomfort vibration and/or noise produced during the operation of the motor, and which sufficiently reduces the changing of output torque of the motor.

The above object has been achieved by the present invention, which provides an apparatus for driving an electric motor, comprising a full-wave rectifier which rectifies an alternating current supplied from an alternating-current power supply, and supplies a full-wave rectified current to said motor, a chopper which chops the full-wave rectified current supplied from the rectifier to the motor so that the chopped current is applied to the motor, and a control device which generates a chopping pulse signal having a first signal characteristic corresponding to a given motor control target and a second signal characteristic to reduce an alternating-current component of the full-wave rectified current supplied to the motor, the control device supplying the chopping pulse signal to the chopper so that the chopper chops the full-wave rectified current according to the chopping pulse signal.

In the motor driving apparatus constructed as described above, the control device can generate the chopping pulse signal at a high frequency, so that the high frequency-switched or -chopped voltage waveform may be supplied to the electric motor. Consequently the driving apparatus can significantly largely reduce the generation of vibration or noise from the motor. In addition, since the chopping pulse signal has the second signal characteristic to reduce the alternating-current (AC) component of the full-wave rectified current supplied to the motor, the electric current flowing through the motor is free from the AC characteristic. Thus, the output torque of the motor is effectively prevented from changing at the frequency of the voltage waveform of the AC power supply, for example, 100 Hz or 120 Hz. The present driving apparatus need not employ an exclusive DC power supply for reducing the generation of vibration and/or noise from the motor. It is preferred that the AC component of the rectified current supplied to the motor be completely removed. However, the AC component of the current supplied to the motor need not be completely removed, so long as the vibration and/or noise generated from the motor is reduced to such an extent that practically provides no problem. The given motor control target may be, e.g., a target rotation speed of the motor.

According to a preferred feature of the present invention, the control device comprises a width-modulated pulse signal generator which generates, as the chopping pulse signal, a width-modulated pulse signal having, as the first signal characteristic, a modulated pulse width corresponding to the given motor control target, and a width-modulated pulse signal modifier which modifies the width-modulated pulse signal to have the second signal characteristic to reduce the alternating-current component of the full-wave rectified current supplied to the motor. The width-modulated pulse signal modifier may comprise a pulse-width modifier which modifies the pulse width of the width-modulated pulse signal to have a modified pulse width as the second signal characteristic, the width-modulated pulse signal generator generating a unit of the width-modulated pulse signal including a first voltage state and a second voltage state different from the first voltage state, the modified pulse width being equal to a length of one of the first and second voltage states.

According to another feature of the present invention, the pulse-width modifier comprises a phase detector which detects a phase of the full-wave rectified current, the pulse-width modifier modifying the pulse width of the width-modulated pulse signal based on the phase detected by the phase detector.

According to yet another feature of the present invention, the pulse-width modifier comprises a voltage detector which detects a voltage of the full-wave rectified current, the pulse-width modifier modifying the pulse width of the width-modulated pulse signal based on the voltage detected by the phase detector. In this case, even if the voltage of the rectified current unexpectedly changes for some reason, the pulse-width modifier can provide a modified pulse width which compensates for, or follows, the unexpected voltage change.

According to another preferred feature of the present invention, the width-modulated pulse signal modifier comprises a period modifier which modifies a period of the width-modulated pulse signal to have a modified period as the second signal characteristic. The period modifier may comprise a phase detector which detects a phase of the full-wave rectified current, the period modifier modifying the period of the width-modulated pulse signal based on the phase detected by the phase detector. Alternatively, the period modifier may comprise a voltage detector which detects a voltage of the full-wave rectified current, the period modifier modifying the period of the width-modulated pulse signal based on the voltage detected by the voltage detector. In the latter case, even if the voltage of the rectified current unexpectedly changes for some reason, the period modifier can provide a modified period which compensates for, or follows, the unexpected voltage change.

In a preferred embodiment of the present invention, the width-modulated pulse signal generator comprises a rate pulse generator which generates a rate pulse signal having a reference pulse width, at a reference period shorter than a period of the alternating current supplied from the alternating-current power supply, and a width-modulated pulse signal generating device which generates the width-modulated pulse signal having the modulated pulse width corresponding to the motor control target, at a period equal to the reference period of the rate pulse signal.

In another preferred embodiment of the present invention, the width-modulated pulse signal modifier comprises a voltage detector which detects a voltage of the full-wave rectified current, and means for modifying the reference pulse width corresponding to the motor control value, into a modified pulse width obtained by multiplying the reference pulse width by a reverse number of the voltage detected by the voltage detector.

In yet another preferred embodiment of the present invention, the width-modulated pulse signal modifier comprises a frequency-modulated pulse signal generator which generates a frequency-modulated pulse signal at a modulated period proportional to a voltage of the full-wave rectified current, and wherein the width-modulated pulse signal generator generates the width-modulated pulse signal having the modulated pulse width corresponding to the motor control target, at a period equal to the modulated period of the frequency-modulated pulse signal which has been generated by the frequency-modulated pulse signal generator.

In another embodiment of the present invention, the chopper comprises a solid-state or static switching element. The static switching element may comprise a transistor such as IGBT (insulated gate bipolar transistor) or FET (field effect transistor).

In yet another embodiment of the present invention, the motor driving apparatus further comprises an insulator-type signal transmitter provided between the chopper and the control device, the signal transmitter transmitting the chopping pulse signal generated from the control device, to the chopper, in a state in which the control device is electrically insulated from the chopper.

In another preferred embodiment of the present invention, the control device comprises means for generating the chopping pulse signal having a frequency not lower than 10 KHz. This frequency is sufficiently high to effectively reduce the vibration and/or noise generated during the operation of the electric motor driven by the present apparatus. In this case, the motor may advantageously be used as a drive source of a sewing machine.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings in which.

DETAILED DESCRIPTION OF THE PREFERRED EMBODIMENTS

By reference to FIG. 1, FIG. 2, FIGS. 3(A) to 3(E), and FIGS. 4–7, there will be described a driving apparatus 30 for driving an electric motor 33 employed in a sewing machine. The driving apparatus 30 embodies the present invention.

Figure 1:
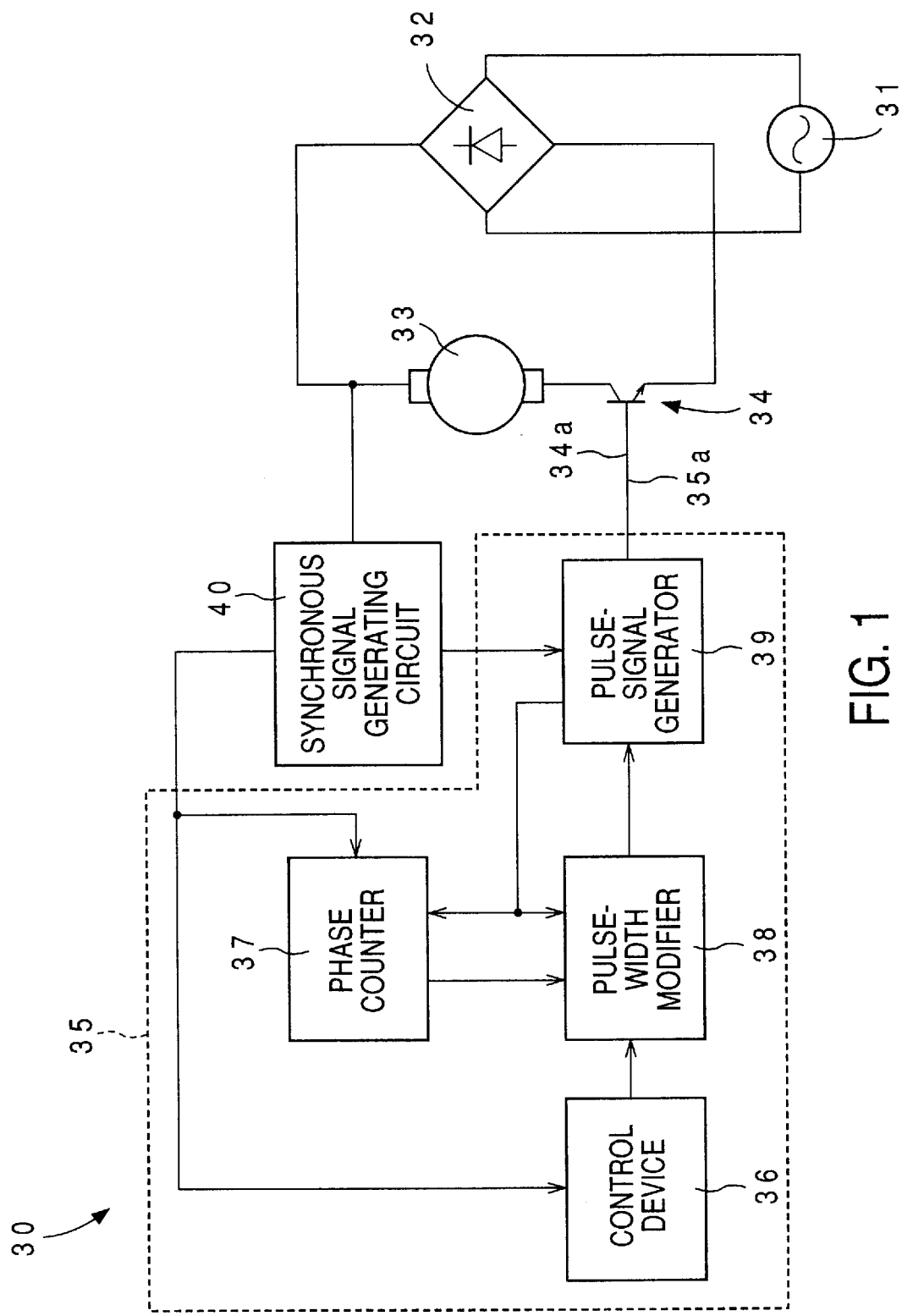
FIG. 1 is a diagrammatic view of a driving apparatus embodying the present invention.
Figure 3:
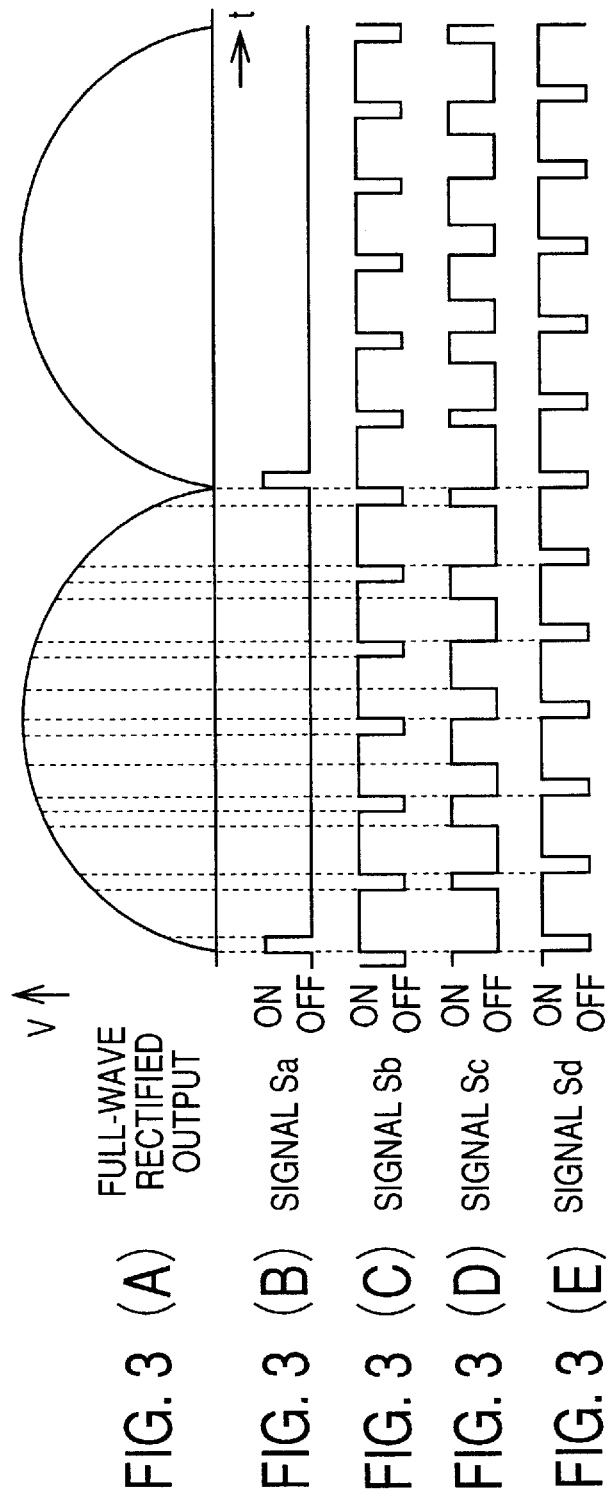
FIG. 3(A) is a graph showing a voltage waveform of a full-wave rectified output of a rectifying circuit of the apparatus of FIG. 1.
FIG. 3(B) is a graph showing a synchronous signal Sa generated by a synchronous-signal generating circuit of the apparatus of FIG. 1.
FIG. 3(C) is a graph showing a pulse signal Sb generated by a first timer of the microcomputer of FIG. 2.
FIG. 3(D) is graph showing an inverted pulse signal Sc generated by a second timer of the microcomputer of FIG. 2.
FIG. 3(E) is a graph showing a pulse signal Sd used to control a timing at which a modified pulse width W is written in the second timer 46.

In FIG. 1 in which the electric arrangement of the driving apparatus 30 is schematically illustrated, reference numeral 31 designates a commercially available 100 V (volt) AC (alternating current) power supply. Input terminals of a full-wave rectifying circuit 32 are connected to the AC supply 31. The full-wave rectifying circuit 32 has the function of full-wave rectifying an AC output of the AC supply 31 and providing a full-wave rectified output as shown in FIG. 3(A) from output terminals thereof. An electric motor 33, such as a universal motor, and a switching element 34 each are connected in series to the output terminals of the rectifying circuit 32. The switching element 34 functions as a chopper of the driving apparatus in accordance with the present invention. Thus, the full-wave rectified output of the rectifying circuit 32 is supplied to the universal motor 33, and is chopped by the switching element 34. The switching element 34 is provided by, e.g., a transistor such as IGBT (insulated gate bipolar transistor) or FET (field effect transistor).

A one-chip microcomputer 35 controls the switching element 34 by selectively placing the element 34 in an ON state thereof or an OFF state thereof. It is preferred that an electrically insulating, signal transmitting element, such as a photocoupler, be provided between a control terminal 34a of the switching element 34 (e.g., base of a transistor) and a control-signal output terminal 35a of the microcomputer 35. The photocoupler transmits a control signal generated by the microcomputer 35, to the switching element 34, in such a manner that the microcomputer 35 is electrically insulated from the switching element 34. The microcomputer 35 functions as a control device 36, a phase counter 37, a pulse-width modifier 38, and a pulse-signal generator 39. In the present embodiment, the one-chip microcomputer 35 functions as a chopper control device of the driving apparatus in accordance with the present invention.

A synchronous signal generating circuit 40 is connected to one of the two output terminals of the full-wave rectifying circuit 32. The generating circuit 40 generates a synchronous signal Sa as shown in FIG. 3(B) which takes an ON state (i.e., high voltage state) each time the full-wave rectified output of the rectifying circuit 32 takes a zero volt level. The synchronous signal Sa is supplied to each of the control device 36, the phase counter 37, and the pulse-signal generator 39 of the microcomputer 35.

Figure 2:
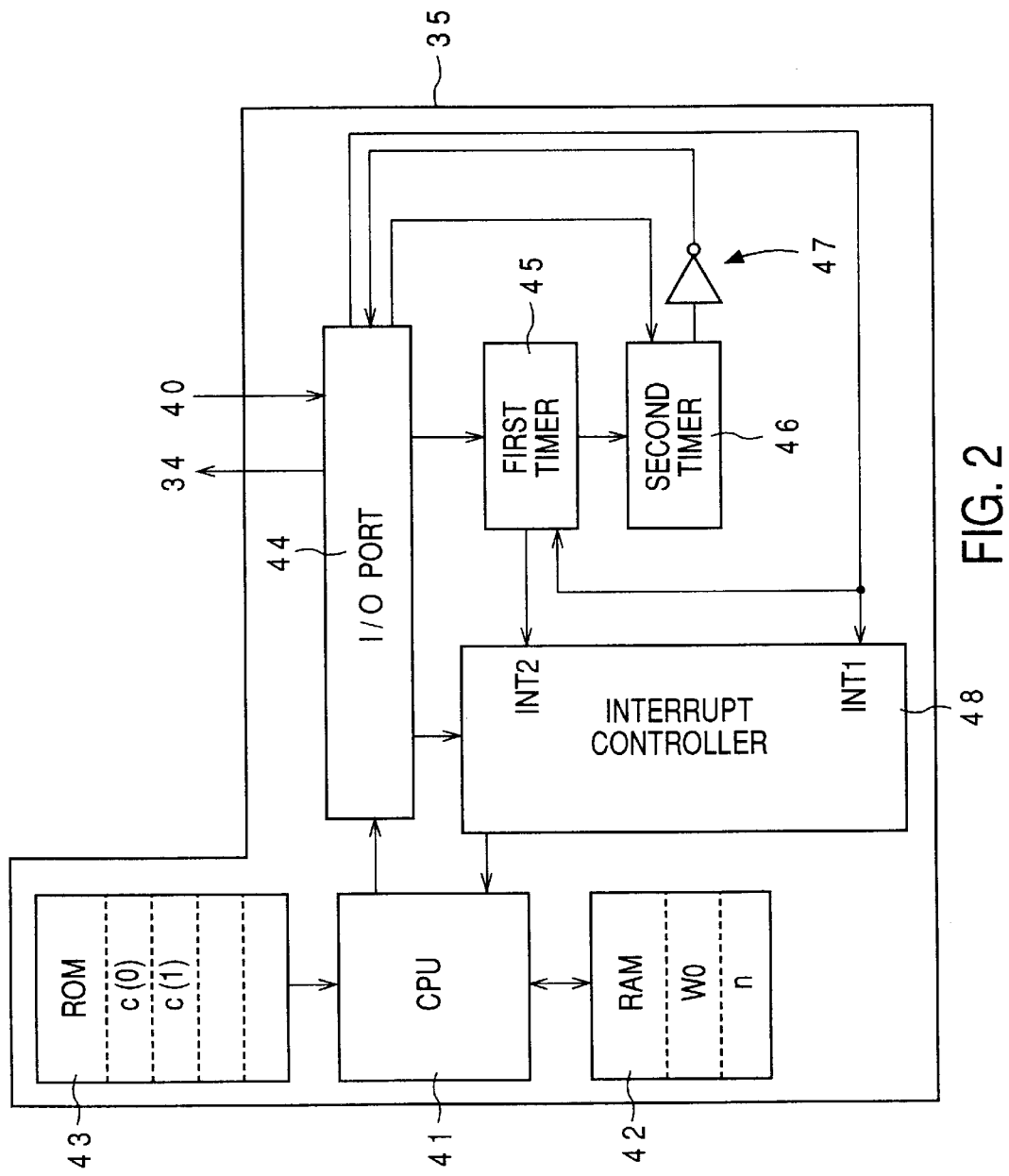
FIG. 2 is a view of an electronic arrangement of a one-chip microcomputer employed in the apparatus of FIG. 1.

As shown in FIG. 2, the one-chip microcomputer 35 includes a CPU (central processing unit) 41, a RAM (random access memory) 42, a ROM (read only memory) 43, an I/O (input and output) port 44, a first timer 45, a second timer 46, an inverter 47, and an interrupt controller 48. The CPU 41 carries out various arithmetic operations. The RAM 42 temporarily stores various output data of the control device 36, such as a reference pulse width, W0, and a counted value, n, of the phase counter 37 both of which will be described later. The ROM 43 permanently stores various control programs including the programs represented by the flow charts of FIGS. 5, 6, and 7, and correction factor values, c(n) (n=0, 1, . . . ), all of which will be described later. In the present embodiment, number n can take an integer of from 0 to 200. Via the I/O port 44, the microcomputer 35 receives data (e.g., synchronous signal Sa) from the synchronous signal generating circuit 40, and generates data (i.e., control signal) to the switching element 34. Respective functions of the first and second timers 45 and 46 will be described later. The interrupt controller 48 has a first and a second interrupt-request terminal, INT1 and INT2, and controls respective interrupt processings requested through the two terminals INT1 and INT2.

There will be described the function of each of the elements 39, 37, 36, and 38 of the one-chip microcomputer 35 shown in FIG. 1. First, the pulse-signal generator 39 generates a pulse signal at a prescribed frequency or period. The length or width of each high-voltage state of the pulse signal is modified by the pulse-width modifier 38 in a manner described later. The thus generated pulse signal is supplied as the control signal to the control terminal 34a of the switching element 34, so that the switching element 34 is selectively placed in the ON or OFF state. More specifically described, the pulse-signal generator 39 includes the first timer 45 functioning as a rate-pulse generator which generates a pulse signal, Sb, at the prescribed frequency or period, as shown in FIG. 3(C).

The pulse-signal generator 39 additionally includes the second timer 46 functioning as a retriggerable one-shot generator which is triggered at the timing of commencement of each high-voltage state of the pulse signal Sb so as to generate an inverted pulse signal, Sc, as shown in FIG. 3(D). In more detail, the second timer 46 generates, based on a pulse width written at the timing of each low-voltage state of a signal, Sd, shown in FIG. 3(E), an inverted pulse signal Sc having a low-voltage-state length corresponding to the written pulse width, at the commencement of the following high-voltage state of the trigger signal Sb. The inverted pulse signal Sc generated by the second timer 46 is inverted once more by the inverter 47 so that the twice-inverted signal is supplied as the control signal to the switching element 34 to selectively place the element 34 in the ON or OFF state.

While the twice-inverted signal takes a high-voltage state, the switching element 34 is held in the ON state and, while the twice-inverted signal takes a low-voltage state, the switching element 34 is held in the OFF state. Although the frequency of the pulse signal Sb may be prescribed at any value, it is preferred to employ a pulse signal Sb having a high frequency for the purpose of preventing such noise from being generated from the motor 33 because of the switching or chopping of the switching element 34, which noise has frequencies falling within the human audible sound range. To this end, in the present embodiment, the pulse signal Sb has a 20 KHz frequency. It is however possible to employ a pulse signal Sb having a frequency higher than 20 KHz. It is also possible to employ a smoothing circuit which reduces or removes the chopping-related component, i.e., high-frequency component of the voltage waveform chopped by the switching element 34, thereby smoothing the chopped voltage waveform. In the latter arrangement, a pulse signal Sb having a lower frequency may be employed.

In the present embodiment, the pulse signal Sb is generated by the first timer 45 in synchronism with the phase of the full-wave rectified output of the rectifying circuit 32, so that the counted value n of the phase counter 37 is synchronized with the phase of the full-wave rectified output. To this end, the pulse signal Sb generated by the first timer 45 commences to take a high-voltage state in synchronism with the commencement of each high-voltage state of the pulse signal Sa generated by the synchronous signal generating circuit 40. The pulse signal Sb of the first timer 45 is supplied to the second interrupt-request terminal INT2 of the interrupt controller 48. The first interrupt-request terminal INT1 of the interrupt controller 48 has a higher interrupt priority than that of the second interrupt-request terminal INT2.

The phase counter 37 counts a value n indicative of a current phase of the full-wave rectified output of the rectifying circuit 32. The counted number n is temporarily stored in the RAM 42. The phase counter 37 clears a counted value n when the leading edge of each high-voltage state of the synchronous signal Sa (FIG. 3(B)) is input to the first interrupt-request terminal INT1 of the interrupt controller 48, and increments a counted value n, by one, each time the leading edge of a high-voltage state of the pulse signal Sb (FIG. 3(C)) from the first timer 45 is input to the second interrupt-request terminal INT2 of the interrupt controller 48. Thus, a current counted number n of the phase counter 37 represents a current phase, p(n), of the full-wave rectified output of the rectifying circuit 32. This phase p(n) is defined by the following expression:

$$p(n)=2\cdot\pi\cdot(f1/f2)\cdot n$$

where
f1 is the frequency of the AC output of the AC power supply 31, and
f2 is the chopping frequency, i.e., frequency of the pulse signal Sb generated by the first timer 45.

When the control device 36 is started, the control device 36 calculates a reference pulse width, W0, corresponding to a given or preset motor control target value, and writes the pulse width W0 in the RAM 42. Thus, the reference pulse width W0 is temporarily stored in the RAM 42. The control device 36 may be of a well-known proportional- control, adaptive-control, or fuzzy-control type. The starting of the control device 36 is not limited to any specific time. In the present embodiment, the control device 36 is started when the leading edge of each high-voltage state of the synchronous signal Sa from the generating circuit 40 is input to the first interrupt-request terminal INT1 of the interrupt controller 48.

The pulse-width modifier 38 is started when the leading edge of each high-voltage state of the pulse signal Sb from the first timer 45 is input to the second interrupt-request terminal INT1. The modifier 38 modifies the reference pulse width W0 written or stored in the RAM 42 by the control device 36, into a modified pulse width, W, according to the following expression:

$$W=c(n)\cdot W0$$

where c(n) is the correction factor stored in the ROM 43.

The pulse-width modifier 38 writes the modified pulse width W in the second timer 46 when the signal Sd shown in FIG. 3(E) takes a low-voltage state. When the following high-voltage state of the trigger signal Sb is input to the second timer 46, the second timer 46 generates an inverted pulse signal Sc (FIG. 3(D)) having a low-voltage-state length corresponding to the modified pulse width W. The correction factor c(n) is defined by an inverse number of a sine value of an average phase of the following single interval (i.e., one high-voltage state and one low-voltage state) of the pulse signal Sb, i.e., the following expression:

$$c(n)=1/|\sin((p(n+1)+p(n+2))/2)|$$

The above expression may be replaced by another expression:

$$c(n)=2/(|\sin(p(n+1))|+|\sin(p(n+2))|)$$

Figure 4:
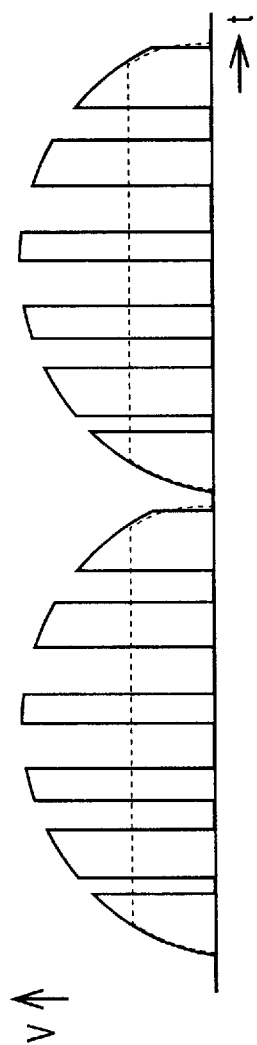
FIG. 4 is a graph showing a voltage waveform supplied to an electric motor driven by the apparatus of FIG. 1.

Because of the correction factor c(n) represented by the above first or second expression, the chopped voltage waveform indicated at solid line in FIG. 4 is applied to the electric motor 33. As is apparent from this figure, the chopped voltage waveform applied to the electric motor 33 contains only a significantly largely reduced AC component, i.e., sine-curve voltage component indicated at broken line. Thus, the AC component of the electric current flowing through the electric motor 33 is largely reduced. Therefore, the correction factor c(n) may be determined in various manners other than described above, so long as the correction factor c(n) contributes to effectively reducing the AC component of the electric current flowing through the electric motor 33, thereby smoothing the waveform of the motor current. The correction factor values c(n) are pre-stored in the ROM 43. In this connection, it is possible that the modifier 38 have the function of modifying the correction factor c(n) defined by the above first or second expression, so that the modified correction factor may be suitable for the specific characteristics of the electric circuit of the driving apparatus 30.

Next, there will be described the operation of the driving apparatus 10 constructed as described above, by reference to the flow charts of FIGS. 5 to 7. The following description will be mainly focused on the operation of the CPU 41 of the one-chip microcomputer 35.

Figure 5:
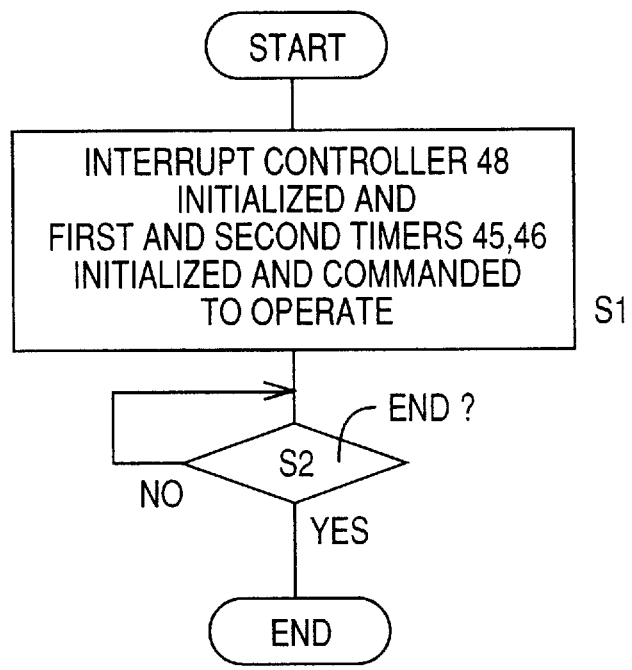
FIG. 5 is a flow chart representing a main processing carried out by the microcomputer of FIG. 2.

First, at Step S1 of FIG. 5, the CPU 41 initializes the interrupt controller 48 and the first and second timers 45 and 46, and commands the first and second timers 45 and 46 to operate, all via the I/O port 44. The CPU 41 starts the interrupt-processing function and, when the leading edge of each high-voltage state of the synchronous signal Sa (FIG. 3(B)) generated by the generating circuit 40 is input to the first interrupt-request terminal INT1 of the interrupt controller 48, the control of the CPU 41 proceeds with a first interrupt handler ("INTERRUPT HANDLER 1") shown in FIG. 6.

Figure 6:
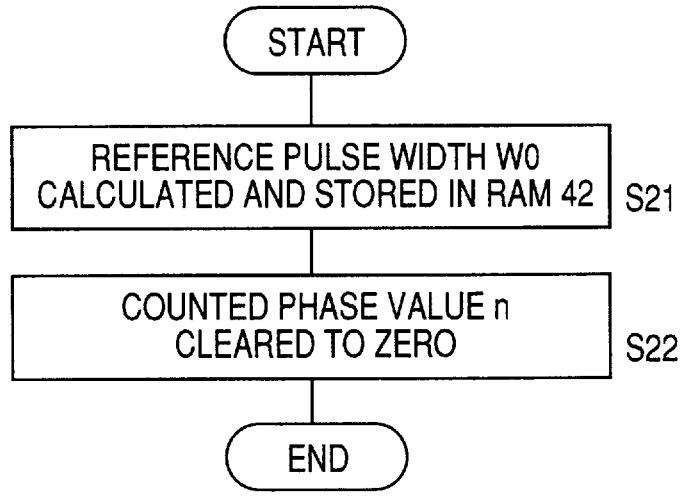
FIG. 6 is a flow chart representing a first interrupt handler carried out by the microcomputer of FIG. 2.

At Step S21 of FIG. 6, the CPU 41 carries out an interrupt processing corresponding to the control device 36 shown in FIG. 1. Specifically described, the CPU 41 calculates a reference pulse width W0 corresponding to a given motor control value, and writes the reference pulse width W0 into an appropriate memory area of the RAM 42. Step S21 is followed by Step S22 to clear a counted value n of the phase counter 37, i.e., reset the value n to zero. Thus, the first interrupt handler is ended.

Figure 7:
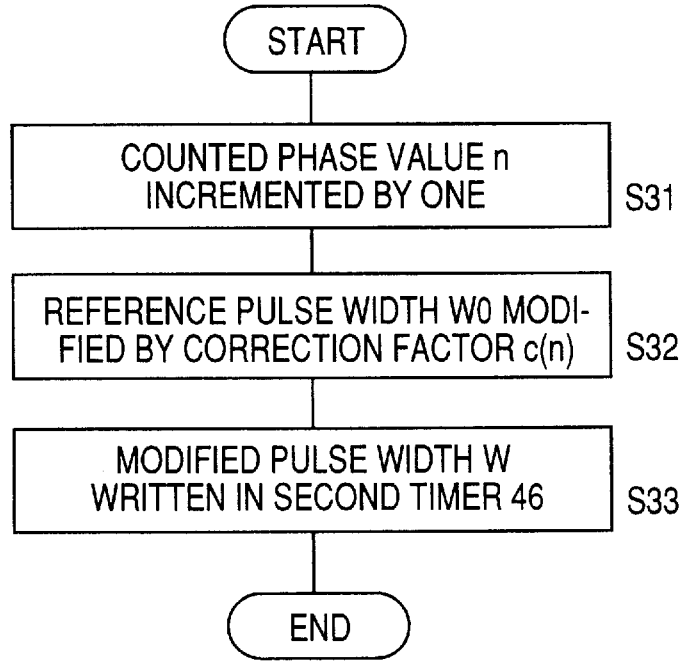
FIG. 7 is a flow chart representing a second interrupt handler carried out by the microcomputer of FIG. 2.

Meanwhile, when the leading edge of each high-voltage state of the pulse signal Sb generated by the first timer 46 (FIG. 3(C)) is input to the second interrupt-request terminal INT2 of the interrupt controller 48, the control of the CPU 41 proceeds with a second interrupt handler ("INTERRUPT HANDLER 2") shown in FIG. 7.

At Step S31 of FIG. 7, the CPU 41 increments a current counted value n of the phase counter 37, by one, i.e., changes to the current value n to an incremented value, (n+1). Subsequently, at Step S32, the CPU 41 modifies the reference pulse width W0 written or stored in the RAM 42 by the control device 36, by utilizing the correction factor c(n) stored in the ROM 43, according to the following expression:

$$W=c(n)\cdot W0$$

Then, at Step S33, the CPU 41 writes the thus modified pulse width W in the second timer 46. Thus, the second interrupt handler is ended. If the next trigger signal, i.e., leading edge of the following high-voltage state of the pulse signal Sb (FIG. 3(C)) generated by the first timer 45 is input to the second interrupt-request terminal INT2, with the modified pulse width W being written or stored in the second timer 46, the second timer 46 generates an inverted pulse signal Sc (FIG. 3(D)) having a low-voltage state length equal to the modified pulse width W. This inverted pulse signal Sc is inverted once again by the inverter 47 to have a high-voltage state length equal to the modified pulse width W. This twice-inverted signal is supplied to the control terminal 34a of the switching element 34 (e.g., base of a transistor), so that the switching element 34 is selectively placed in the ON or OFF state thereof. Thus, the full-wave rectified output of the rectifying circuit 32 is chopped as indicated at solid line in FIG. 4. The thus chopped voltage waveform is supplied to the universal motor 33, so that the motor 33 is driven or rotated.

As shown in FIG. 4, the chopped voltage waveform has longer high-voltage states at lower voltages and shorter high-voltage states at higher voltages. Thus, the voltage waveform supplied to the universal motor 33 has a generally trapezoidal shape as indicated at broken line in FIG. 4, and is free from a sine-curve voltage component. Consequently an electric current having a smooth waveform without a sine-curve component or AC characteristic flows through the electric motor 33, so that the output torque of the motor 33 does not change or oscillate at a period or frequency of, e.g., 100 Hz or 120 Hz.

In the present embodiment, the frequency of pulse signal Sc generated by the second timer 46, i.e., chopping frequency at which the switching element 34 is selectively placed in the ON or OFF state, is prescribed at a high value (e.g., 20 KHz), so that the voltage waveform chopped at the high frequency is applied to the universal motor 33. Consequently the universal motor 33 produces a constant and continuous torque, which results in largely reducing the vibration and noise produced during the operation of the motor 33.

Also, in the present embodiment, the reference pulse width W0 of the pulse signal Sc used to selectively place the switching element 34 in the ON or OFF state, is modified in such a manner that the AC component contained in the electric current supplied to the universal motor 33 is minimized. Therefore, the voltage waveform supplied to the motor 33 enjoys a generally trapezoidal shape as indicated at broken line in FIG. 4, i.e., does not contain any sine-curve voltage component. Consequently an electric current having a smooth waveform without any sine-curve component or AC characteristic flows through the motor 33, thereby assuredly eliminating the disadvantage that the output torque of the motor 33 varies at a period or frequency such as 100 Hz or 120 Hz.

While in the present embodiment the reference pulse width W0 is modified, at Step S32 of FIG. 7, by using the two hundred correction factor values c(n) pre-stored in the ROM 43, it is otherwise possible to calculate, at Step S32, an appropriate correction factor value c(n) according to the previously identified expression defining the values c(n) and modify the reference pulse width W0 by using the thus calculated value c(n).

Although in the present embodiment the universal motor 33 is used as the electric motor driven by the driving apparatus 30, the universal motor 33 may be replaced by a DC motor.

Moreover, while in the present embodiment the control device 36, phase counter 37, pulse-width modifier 38, and pulse-signal generator 39 are provided by the one-chip microcomputer 35, discrete circuits may be combined to replace the microcomputer 35.

Furthermore, although in the present embodiment the current phase of the full-wave rectified output of the rectifying circuit 32 is detected or determined by the phase counter 37 and the determined phase is utilized for modifying the reference pulse width W0 for providing a modified pulse width W of the pulse signal Sc, it is possible to employ, in place of the phase detector, a voltage detector which detects a current voltage of the full-wave rectified output and modify, based on the detected voltage, the reference pulse width W0 for providing a modified pulse width W of the pulse signal Sc.

Figure 8:
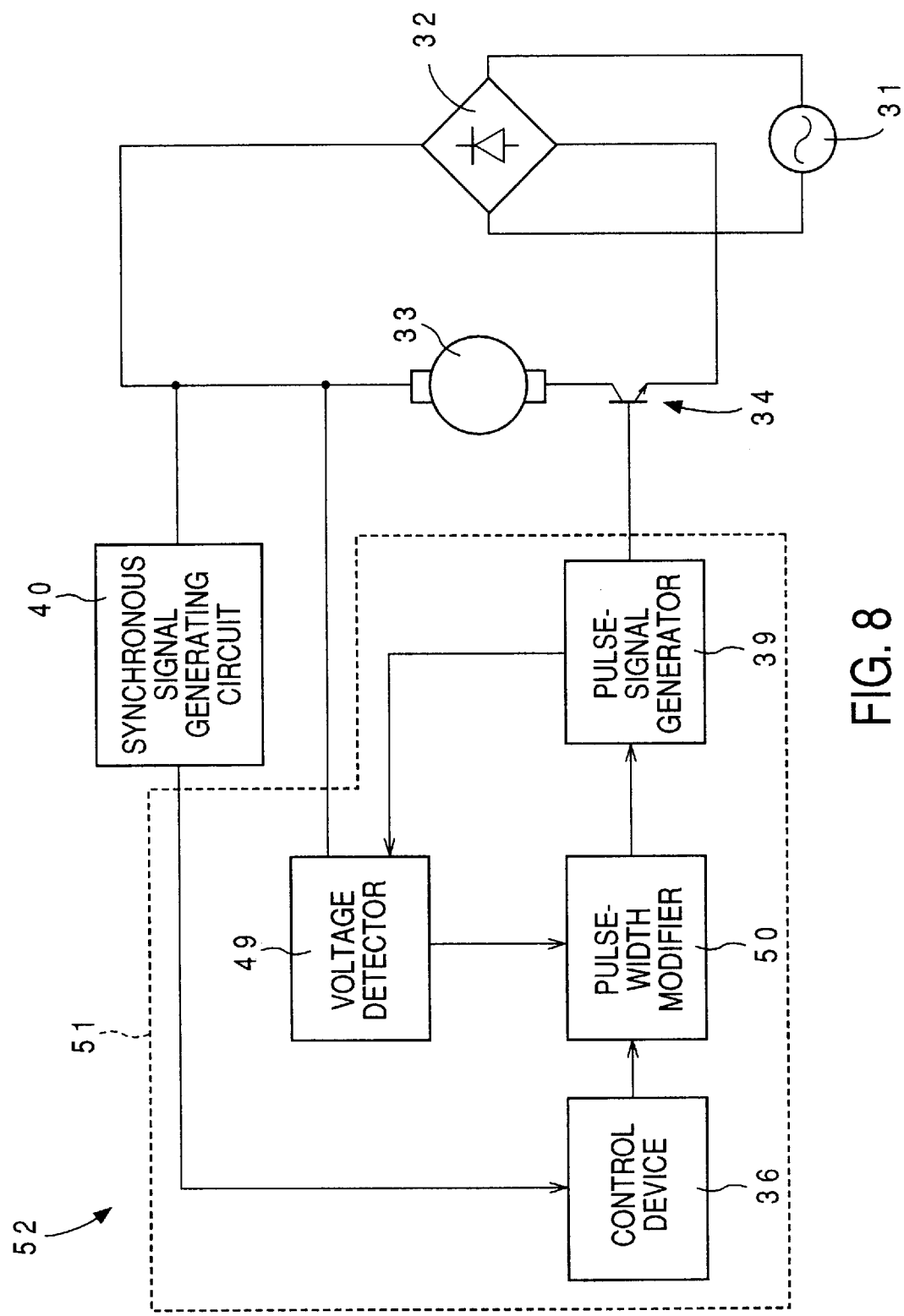
FIG. 8 is a view corresponding to FIG. 1, showing a driving apparatus as a second embodiment of the invention.

FIG. 8 shows a second embodiment of the present invention relating to a driving apparatus 52 employing a voltage detector 49 and a pulse-width modifier 50 in place of the phase detector 37 and the pulse-width modifier 38 of the driving apparatus 30 shown in FIG. 1, respectively. The same reference numerals as used in FIG. 1 are used to designate the corresponding elements of the second embodiment shown in FIG. 8, and the repetitive description of those elements is omitted. The following description will be focused on the differences of the first and second driving apparatus 30 and 52.

The voltage detector 49 may be provided by an analog to digital (A/D) converter or the like. The voltage detector 49 detects a current voltage of a full-wave rectified output of a full-wave rectifying circuit 32, and generates a voltage detection signal indicative of the detected current voltage of the full-wave rectified output. The pulse-width modifier 50 receives the voltage detection signal from the voltage detector 49, and modifies a reference pulse width W0 provided by a control device 36 based on a given or preset motor control target value, into a modified pulse width W proportional to the inverse of a normalized value of the detected current voltage represented by the voltage detection signal. More specifically described, the voltage detector 49 detects a current voltage of the full-wave rectified output at the time of commencement of each low-voltage state of a pulse signal Sb generated by a first timer 45. The driving apparatus 52 includes a one-chip microcomputer 51 having the same hardware construction as shown in FIG. 2. Based on the detected current voltage, the pulse-wave modifier 50 modifies the reference pulse width W0 according to the following expression:

$$W = (C/A) \cdot W0$$

where

A is a normalized value of the detected current voltage, and

C is a factor of proportionality.

Thus, the second driving apparatus 52 enjoys the same advantages as those with the first driving apparatus 30 of FIG. 1. In particular, the driving apparatus 52 is characterized in that the current voltage of the full-wave rectified output is detected and the detected current voltage is utilized for modifying the reference pulse width W0 for providing a modified pulse width W of the pulse signal Sc. Therefore, even when a source voltage of a commercial AC power supply 31 unexpectedly changes because of some reason, the driving apparatus 52 modifies the reference pulse width W0 to a modified pulse width W which compensates for the unexpected source-voltage change, thereby more effectively preventing the fluctuation of output torque of an electric motor 33.

Next, there will be described a driving apparatus 130 for driving an electric motor 133 employed in a sewing machine, by reference to FIG. 9, FIG. 10, FIGS. 11(A) to 11(E), and FIGS. 12–15. The driving apparatus 130 is a third embodiment of the present invention.

Figure 9:
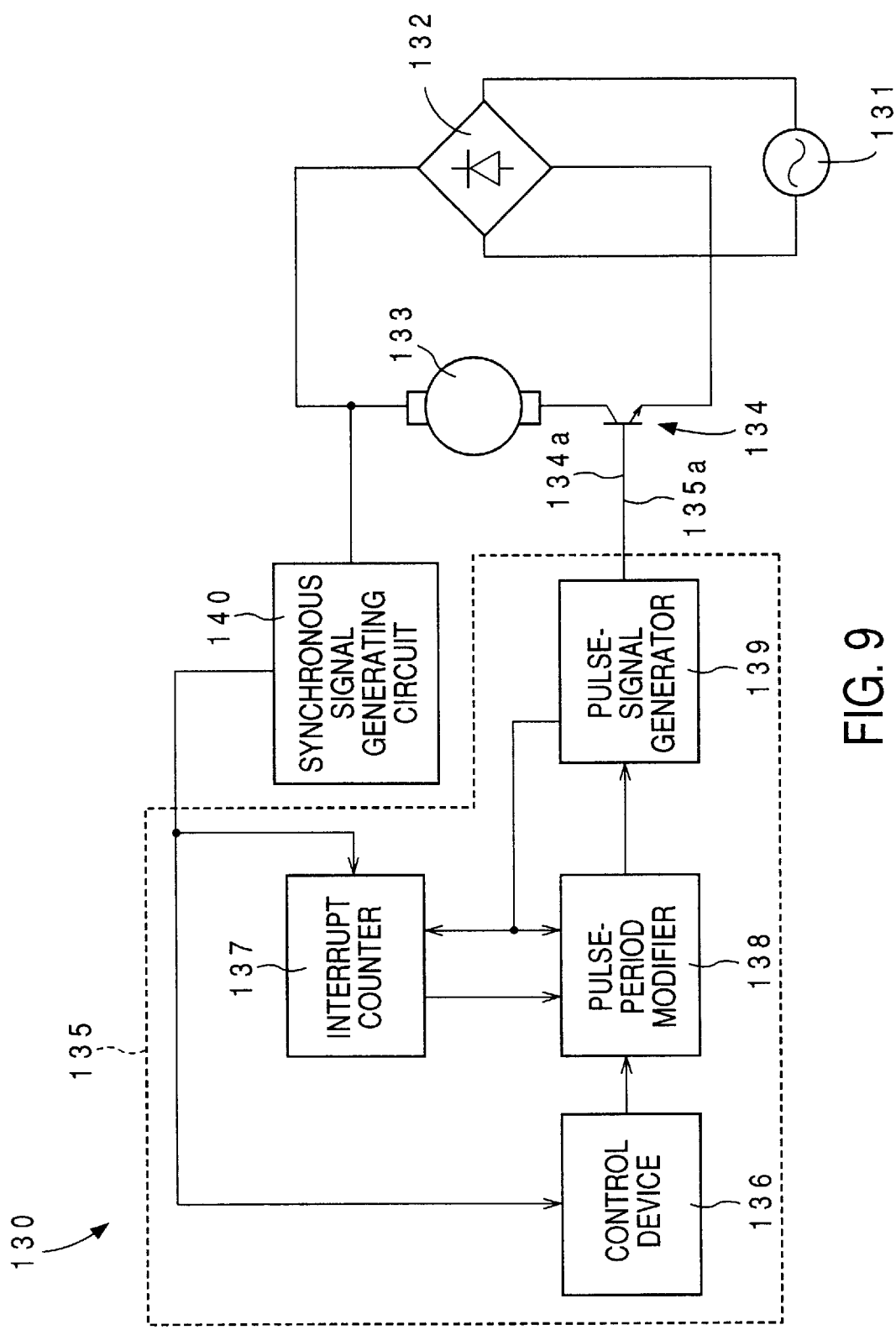
FIG. 9 is a view corresponding to FIG. 1, showing a driving apparatus as a third embodiment of the invention.
Figure 11:
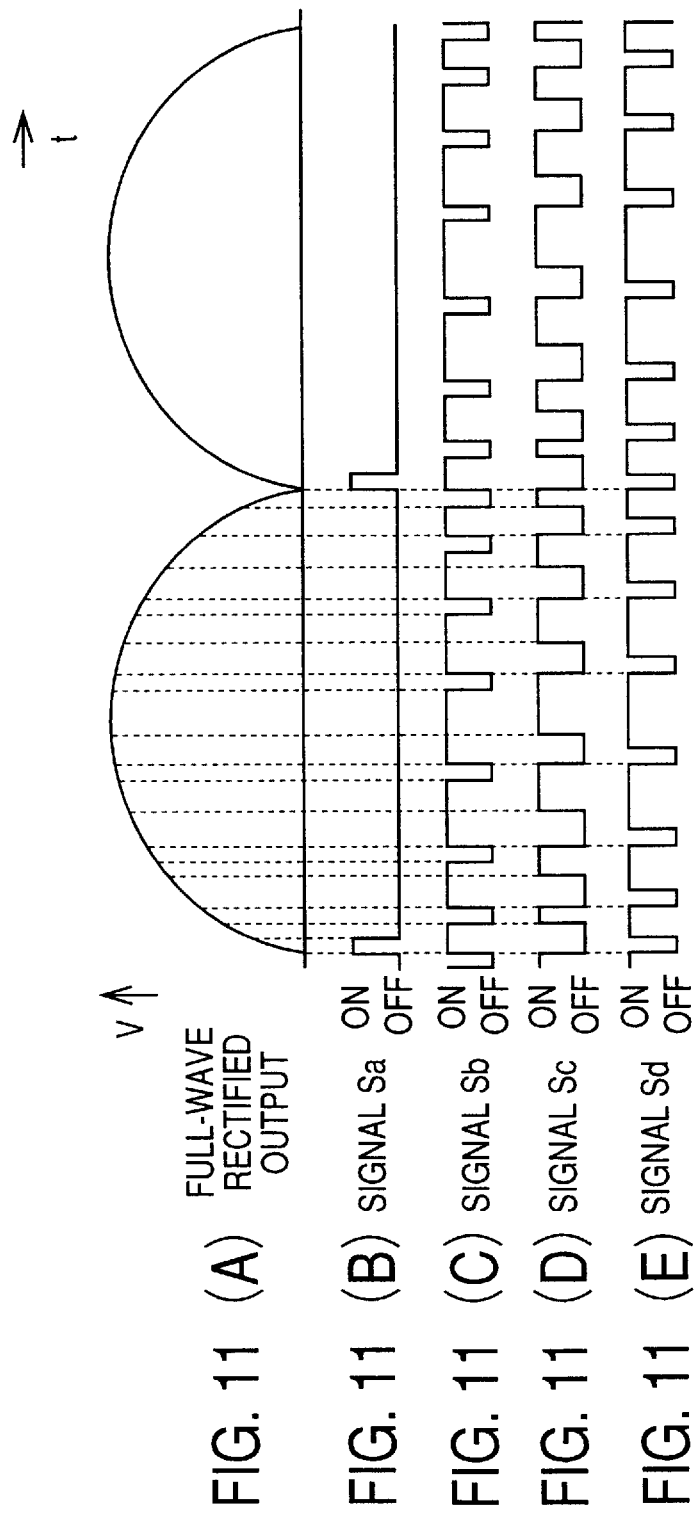
FIG. 11(A) is a graph showing a voltage waveform of a full-wave rectified output of a rectifying circuit of the apparatus of FIG. 9.
FIG. 11(B) is a graph showing a synchronous signal Sa generated by a synchronous-signal generating circuit of the apparatus of FIG. 9.
FIG. 11(C) is a graph showing a pulse signal Sb generated by a first timer of the microcomputer of FIG. 10.
FIG. 11(D) is graph showing an inverted pulse signal Sc generated by a second timer of the microcomputer of FIG. 10.
FIG. 11(E) is a graph showing a signal Sd used to control a timing at which a modified period t(n) is written in the second timer.

In FIG. 9 in which the electric arrangement of the driving apparatus. 130 is schematically illustrated, reference numeral 131 designates a commercially available 100 V AC power supply. Input terminals of a full-wave rectifying circuit 132 are connected to the AC supply 131. The full-wave rectifying circuit 132 has the function of full-wave rectifying an AC output of the AC supply 131 and providing a full-wave rectified output as shown in FIG. 11(A) from output terminals thereof. An electric motor 133, such as a universal motor, and a switching element 134 are connected in series to the output terminals of the rectifying circuit 132. The switching element 134 functions as a chopper of the driving apparatus in accordance with the present invention. Thus, the full-wave rectified output of the rectifying circuit 132 is supplied to the universal motor 133, and is chopped by the switching element 134. The switching element 134 is provided by, e.g., a transistor such as IGBT or FET.

A one-chip microcomputer 135 controls the switching element 134 by selectively placing the element 134 in an ON state thereof or an OFF state thereof. It is preferred that an electrically insulating, signal transmitting element, such as a photocoupler, be provided between a control terminal 134a of the switching element 134 (e.g., base of a transistor) and a control-signal output terminal 135a of the microcomputer 135. The photocoupler transmits a control signal generated by the microcomputer 135, to the switching element 134, in such a manner that the microcomputer 135 is electrically insulated from the switching element 134. The microcomputer 135 functions as a control device 136, an interrupt counter 137, a pulse-period modifier 138, and a pulse-signal generator 139. In the third embodiment, the one-chip microcomputer 135 functions as a chopper control device of the driving apparatus in accordance with the present invention.

A synchronous signal generating circuit 140 is connected to one of the two output terminals of the full-wave rectifying circuit 132. The generating circuit 140 generates a synchronous signal Sa as shown in FIG. 11(B) which takes an ON state (i.e., high-voltage state) each time the full-wave rectified output of the rectifying circuit 132 takes a zero volt level. The synchronous signal Sa is supplied to each of the control device 136 and the interrupt counter 137 of the microcomputer 135.

Figure 10:
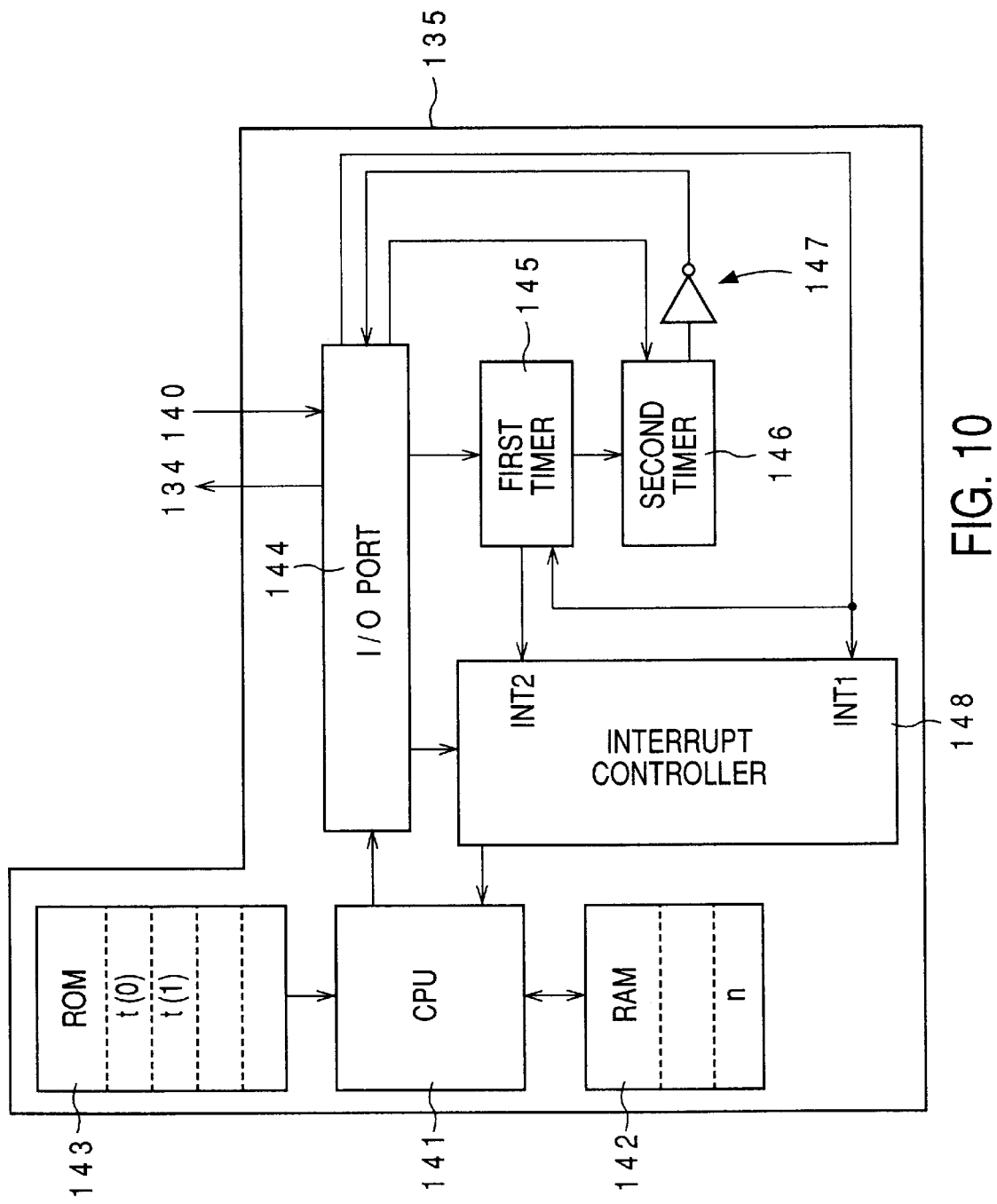
FIG. 10 is a view of the electronic arrangement of a one-chip microcomputer employed in the apparatus of FIG. 9.

As shown in FIG. 10, the one-chip microcomputer 135 includes a CPU 141, a RAM 142, a ROM 143, an I/O port 144, a first timer 145, a second timer 146, an inverter 147, and an interrupt controller 148. The CPU 141 carries out various arithmetic operations. The RAM 142 temporarily stores various output data of the control device 136, such as a counted value, n, of the interrupt counter 137 which will be described later. The ROM 143 permanently stores various control programs including the programs represented by the flow charts of FIGS. 13, 14, and 15, and modified pulse period values, t(n) (n=0, 1, . . . ), all of which will be described later. In the third embodiment, number n can take an integer of from 0 to 200. Via the I/O port 144, the microcomputer 135 receives data (e.g., synchronous signal Sa) from the synchronous signal generating circuit 140, and generates data (i.e., control signal) to the switching element 134. Respective functions of the first and second timers 145 and 146 will be described later. The interrupt controller 148 has a first and a second interrupt-request terminal, INT1 and INT2, and controls respective interrupt processings requested through the two terminals INT1 and INT2.

There will be described the function of each of the elements 139, 137, 136, and 138 of the one-chip microcomputer 135 shown in FIG. 9. First, the pulse-signal generator 139 generates a pulse signal at a frequency or period which is modified by the pulse-period modifier 138 in a manner described later. The thus generated pulse signal is supplied as the control signal to the control terminal 134a of the switching element 134, so that the switching element 134 is selectively placed in the ON or OFF state. More specifically described, the pulse-signal generator 139 includes the first timer 145 which generates a pulse signal, Sb, as shown in FIG. 11(C). The first timer 145 counts to number corresponding to a modified pulse period t(n) described later and, when counting up the number, generates a pulse signal Sb taking a low-voltage state for a unit of time duration needed to count one. When a number indicative of a modified pulse period t(n) is written at the timing of each low-voltage state of a signal, Sd, shown in FIG. 11(E), the first timer 145 starts counting the written number following completion of the current counting of the previously written number.

The pulse-signal generator 139 additionally includes the second timer 146 functioning as a retriggerable one-shot generator which is triggered at the commencement of each high-voltage state of the pulse signal Sb so as to generate an inverted pulse signal, Sc, as shown in FIG. 11(D). In more detail, the second timer 146 generates, based on a reference pulse width, W0, written by the control device 136 at the timing of each high-voltage state of a synchronous signal, Sa, shown in FIG. 11(B), an inverted pulse signal Sc (FIG. 11(D)) having a low-voltage-state length corresponding to the reference pulse width W0.

The inverted pulse signal Sc generated by the second timer 146 is inverted once more by the inverter 147 so that the twice-inverted signal is supplied to the switching element 134 to selectively place the element 134 in the ON or OFF state. While the twice-inverted signal takes a high-voltage state, the switching element 134 is held in the ON state and, while the twice-inverted signal takes a low-voltage state, the switching element 134 is held in the OFF state. Although the frequency of the pulse signal Sb may be prescribed at any value, it is preferred to employ a pulse signal Sb having a high frequency for the purpose of preventing such noise from being generated from the motor 133 because of the switching or chopping of the switching element 134, which noise has frequencies falling within the human audible sound range. To this end, the pulse signal Sb has a 20 KHz frequency, i.e., 50 μsec period. It is however possible to employ a pulse signal Sb having a frequency higher than 20 KHz. It is also possible to employ a smoothing circuit which removes the chopping-related component, i.e., high-frequency component of the voltage waveform chopped by the switching element 134, thereby smoothing the chopped voltage waveform. In the latter arrangement, a pulse signal Sb having a lower frequency may be employed.

The pulse signal Sb generated by the first timer 145 is supplied to the second interrupt-request terminal INT2 of the interrupt controller 148. The first interrupt-request terminal INT1 of the interrupt controller 148 has a higher interrupt priority than that of the second interrupt-request terminal INT2.

The interrupt counter 137 counts a value n indicative of a current total number of the high-voltage states of the pulse signal Sb which have been input to the second interrupt-request terminal INT2 of the interrupt controller 148. The counted number n is temporarily stored in the RAM 142. The interrupt counter 137 clears a counted value n when the leading edge of each high-voltage state of the synchronous signal Sa (FIG. 3(B)) is input to the first interrupt-request terminal INT1 of the interrupt controller 148, and increments a counted value n, by one, each time the leading edge of a high-voltage state of the pulse signal Sb (FIG. 3(C)) from the first timer 45 is input to the second interrupt-request terminal INT2 of the interrupt controller 148.

When the control device 136 is started, the control device 136 calculates a reference pulse width W0 corresponding to a given or preset motor control target value, and writes the reference pulse width W0 in the second timer 156. Thus, the reference pulse width W0 is temporarily stored in the second timer 156. The control device 136 may be of a well-known proportional-control, adaptive-control, or fuzzy-control type. The starting of the control device 136 is not limited to any specific time. In the third embodiment, the control device 136 is started when the leading edge of each high-voltage state of the synchronous signal Sa from the generating circuit 140 is input to the first interrupt-request terminal INT1.

The pulse-period modifier 138 is started when the leading edge of each high-voltage state of the pulse signal Sb (FIG. 11(C)) from the first timer 145 is input to the second interrupt-request terminal INT2. The modifier 138 selects a modified pulse period, t(n), corresponding to a current counted number n of the interrupt counter 137, and writes the modified pulse period t(n) in the first timer 145. The pulse period values t(n) which are modified based on a reference pulse period, t0, are pre-stored in the ROM 143. The reference pulse period to is 50 μsec corresponding to the 20 KHz frequency. As previously described, the first timer 145 receives a modified pulse period t(n) from the modifier 138 while counting a number corresponding to the preceding modified pulse period t(n−1), and starts counting a number corresponding to the received pulse period t(n) after counting up the preceding number.

A pulse period t(n) is obtained by modifying the reference pulse period to by using the sine value of a phase, p(n), of the commercial AC power supply 131, and is defined by the following expressions, assuming that the initial phase, p(0), is zero (p(0)=0):

$$t(n)=t0 \cdot \{a+|\sin(p(n))|\},$$

where a is a constant (e.g., 0.5).

$$p(n+1)=p(n)+2 \cdot f \cdot t(n) \cdot \pi \ (0 \leq p(n) \leq \pi)$$

where f is the frequency of the AC output of the AC supply 131.

By using the above two expressions, the modified pulse period values t(n) are pre-determined and pre-stored in the ROM 143.

Figure 12:
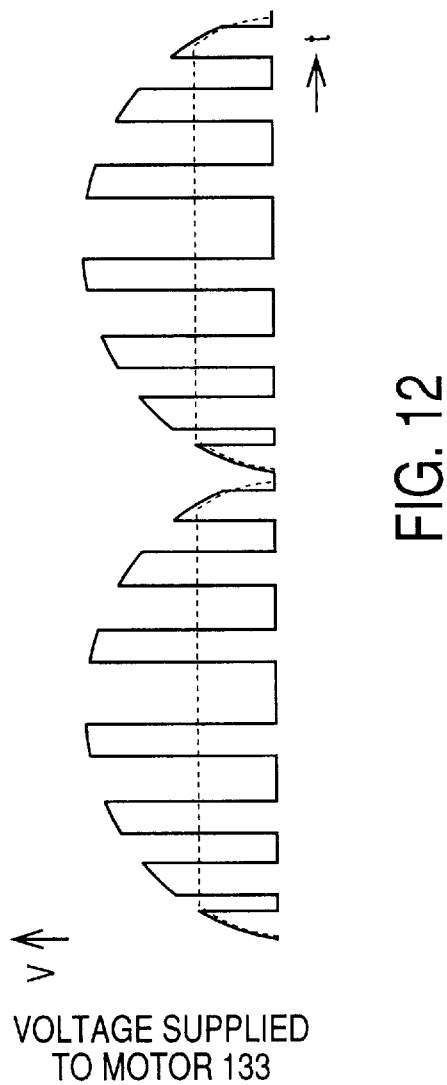
FIG. 12 is a graph showing a voltage waveform supplied to an electric motor driven by the apparatus of FIG. 9.

By employing the modified pulse period t(n), the chopped voltage waveform indicated at solid line in FIG. 12 is applied to the electric motor 133. As is apparent from this figure, the chopped voltage waveform supplied to the electric motor 133 contains only a significantly largely reduced AC component, i.e., sine-curve voltage component indicated at broken line. Thus, the AC component of the electric current flowing through the electric motor 133 is largely reduced. Therefore, the pulse period t(n) may be determined in various manners other than described above, so long as the pulse period t(n) contributes to effectively reducing the AC component of the electric current flowing through the electric motor 133, thereby smoothing the waveform of the motor current. The thus determined pulse period values t(n) are pre-stored in the ROM 143. In this connection, it is possible that the modifier 138 have the function of further modifying the pulse period t(n) defined by the above expressions, so that the further modified pulse period may be suitable for the specific characteristics of the electric circuit of the driving apparatus 130.

Next, there will be described the operation of the driving apparatus 130 constructed as described above, by reference to the flow charts of FIGS. 13 to 15. The following description will be mainly focused on the operation of the CPU 141 of the one-chip microcomputer 135.

Figure 13:
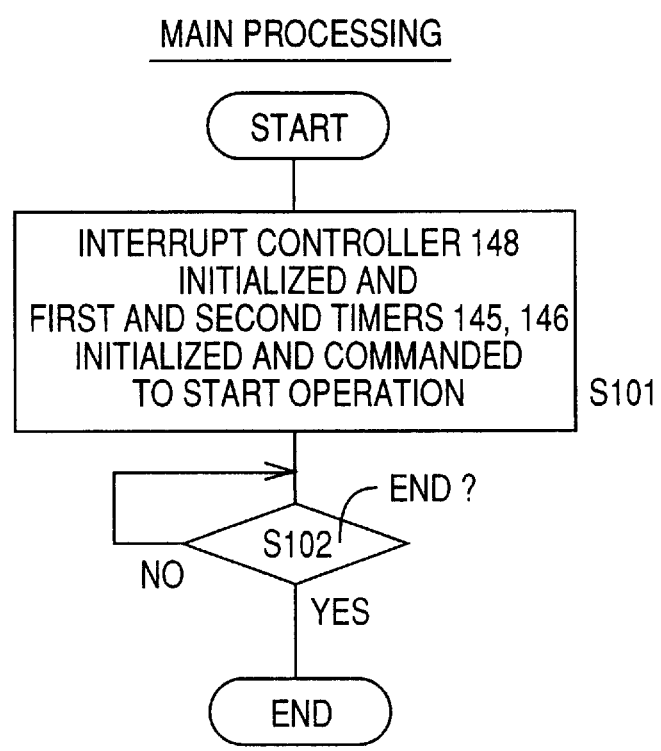
FIG. 13 is a flow chart representing a main processing carried out by the microcomputer of FIG. 10.

First, at Step S101 of FIG. 13, the CPU 141 initializes the interrupt controller 148 and the first and second timers 145 and 146, and commands the first and second timers 145 and 146 to start operating, all via the I/O port 144. The CPU 41 starts the interrupt-processing function and, when the leading edge of each high-voltage state of the synchronous signal Sa (FIG. 11(B)) from the generating circuit 140 is input to the first interrupt-request terminal INT1 of the interrupt controller 148, the control of the CPU 141 proceeds with a first interrupt handler ("INTERRUPT HANDLER 1") shown in FIG. 14.

Figure 14:
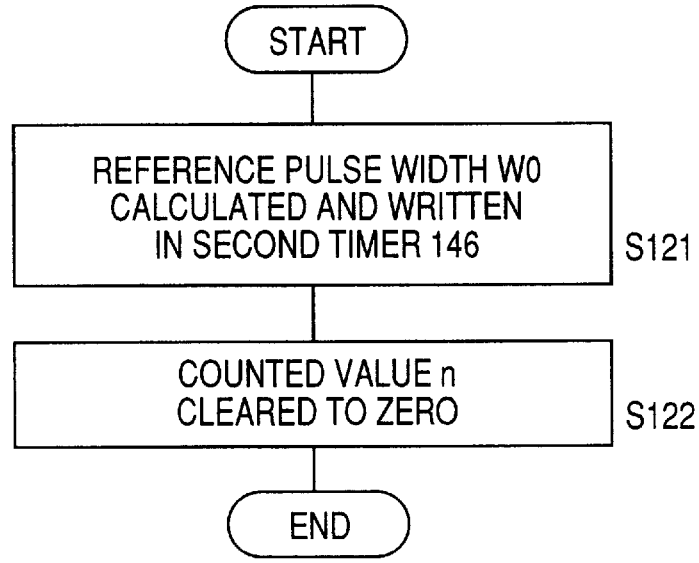
FIG. 14 is a flow chart representing a first interrupt handler carried out by the microcomputer of FIG. 10.

At Step S121 of FIG. 14, the CPU 141 carries out an interrupt processing corresponding to the control device 136 shown in FIG. 9. Specifically described, the CPU 141 calculates a reference pulse width W0 corresponding to a given or preset motor control target value, and writes the reference pulse width W0 in the second timer 146. Step S121 is followed by Step S122 to clear a counted value n of the interrupt counter 137, i.e., reset the value n to zero. Thus, the first interrupt handler is ended.

Figure 15:
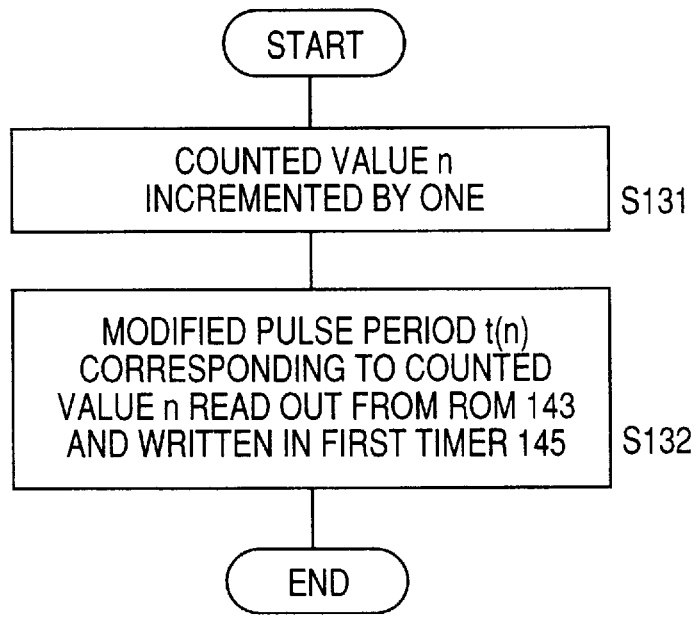
FIG. 15 is a flow chart representing a second interrupt handler carried out by the microcomputer of FIG. 10.

Meanwhile, when the leading edge of each high-voltage state of the pulse signal Sb from the first timer 145 (FIG. 11(C)) is input to the second interrupt-request terminal INT2 of the interrupt controller 148, the control of the CPU 141 proceeds with a second interrupt handler ("INTERRUPT HANDLER 2") shown in FIG. 15.

At Step S131 of FIG. 15, the CPU 141 increments a current counted value n of the phase counter 137, by one, i.e., changes to the current value n to an incremented value, (n+1). Subsequently, at Step S132, the CPU 141 selects a modified pulse period value t(n) corresponding to a current counted value n of the interrupt counter 137, from all the modified pulse period values t(n) pre-stored in the ROM 143, and writes the modified pulse period value t(n) in the first timer 145. Thus, the second interrupt handler is ended.

If the leading edge of a high-voltage state of the pulse signal Sb (FIG. 11(C)) generated by the first timer 145 is input to the second timer 146, with the reference pulse width W0 being stored in the second timer 146, the second timer 146 generates an inverted pulse signal Sc (FIG. 11(D)) having a low-voltage-state length equal to the reference pulse width W0. This inverted pulse signal Sc is inverted once again by the inverter 147 to have a high-voltage-state length equal to the reference pulse width W0. This twice-inverted signal is supplied to the control terminal 134a of the switching element 134 (e.g., base of a transistor), so that the switching element 134 is selectively placed in the ON or OFF state. Thus, the full-wave rectified output of the rectifying circuit 132 is chopped as indicated at solid line in FIG. 12. The thus chopped voltage waveform is supplied to the universal motor 133, so that the motor 133 is driven or rotated.

As shown in FIG. 12, the chopped voltage waveform has shorter off pulse periods at lower voltages and longer off pulse periods at higher voltages while the ON pulse periods remain constant. Thus, the voltage waveform supplied to the universal motor 133 has a generally trapezoidal shape as indicated at broken line in FIG. 12, and does not contain any sine-curve voltage component. Consequently, an electric current having a smooth waveform without any sine-curve component or AC characteristic flows through the electric motor 133, so that the output torque of the motor 133 does not change or oscillate at a period or frequency of, e.g., 100 Hz or 120 Hz.

In the third embodiment, the reference pulse period t0 of the pulse signal Sc generated by the second timer 146, i.e., chopping signal used to selectively place the switching element 134 in the ON or OFF state, is prescribed at a small value (e.g., 50 $\mu$sec) so that the voltage waveform chopped at the high frequency is applied to the universal motor 133. Consequently the universal motor 133 produces a constant and continuous torque, which results in largely reducing the vibration and noise generated during the operation of the motor 133.

In the third embodiment, the reference pulse period t0 of the pulse signal Sc used to selectively place the switching element 134 in the ON or OFF state, is modified in such a manner that the AC component contained in the electric current supplied to the universal motor 133 is minimized. Therefore, the voltage waveform supplied to the motor 133 enjoys a generally trapezoidal shape as indicated at broken line in FIG. 12, i.e., does not contain any sine-curve voltage component. Consequently an electric current having a smooth waveform without any sine-curve component or AC characteristic flows through the motor 133, thereby eliminating the problem that the output torque of the motor 133 may vary at a period or frequency of, e.g., 100 Hz or 120 Hz.

While in the third embodiment one of the modified pulse period values t(n) pre-stored in the ROM 143 is selected, at Step S132 of FIG. 15, by using a current counted value n of the interrupt counter 137, it is otherwise possible to calculate, at Step S132, a modified pulse period t(n) according to the previously identified expressions defining the values t(n) and use the thus calculated value t(n) in place of the reference period t0.

Although in the third embodiment the universal motor 133 is used as the electric motor driven by the driving apparatus 130, the universal motor 133 may be replaced by a DC motor.

Moreover, while in the third embodiment the control device 136, interrupt counter 137, pulse-period modifier 138, and pulse-signal generator 139 are provided by the one-chip microcomputer 135, individual discrete circuits may be combined to replace the microcomputer 135.

Furthermore, although in the third embodiment the interrupt counter 137 counts a value n corresponding to a current phase of the full-wave rectified output of the rectifying circuit 132 and the counted value n is utilized for providing a modified pulse period t(n) of the pulse signal Sc, it is possible to employ, in place of the phase detector, a voltage detector which detects a current voltage of the full-wave rectified output and provides, based on the detected voltage, a modified pulse period t(n) of the pulse signal Sc.

Figure 16:
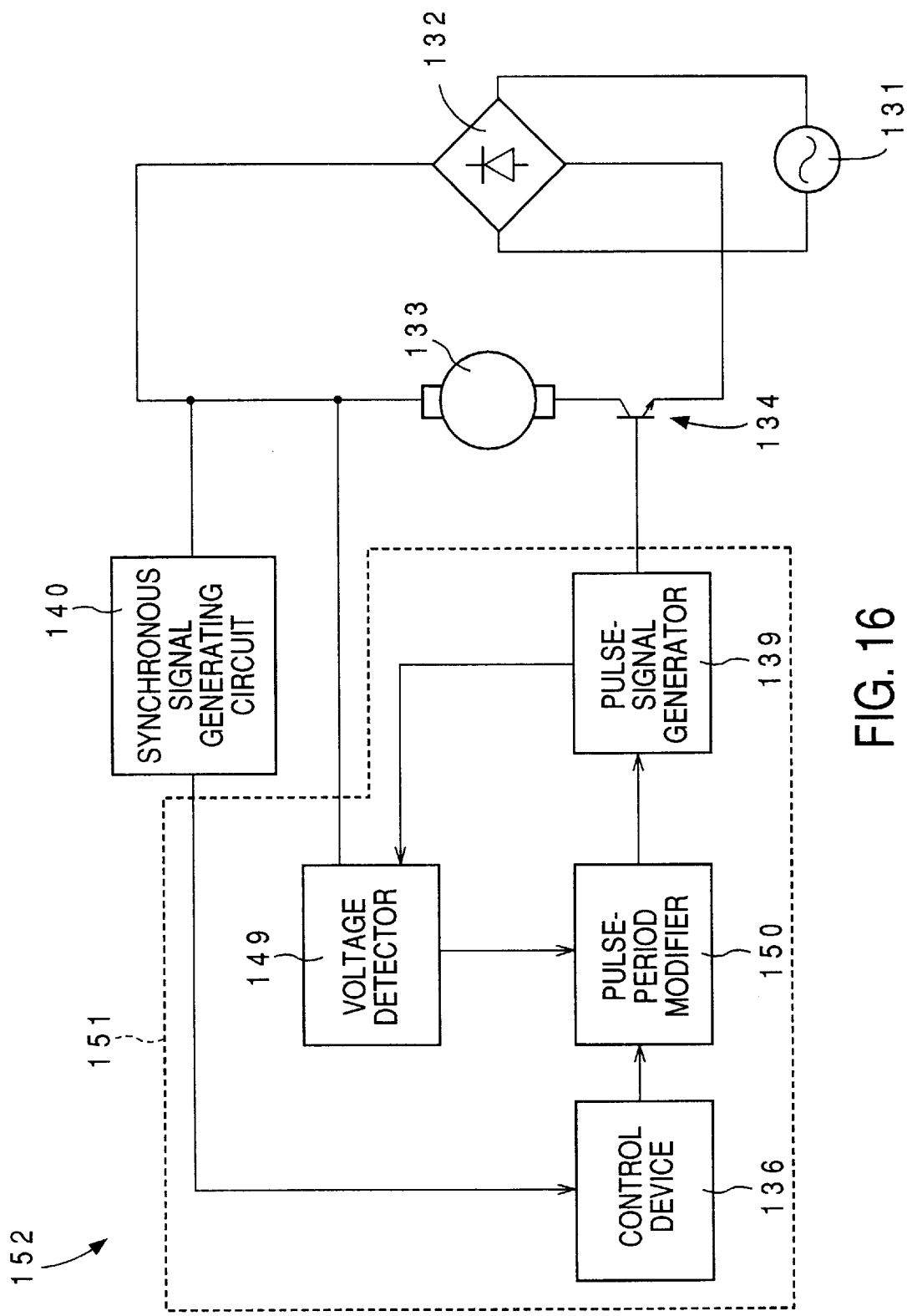
FIG. 16 is a view corresponding to FIG. 1, showing a driving apparatus as a fourth embodiment of the invention.

FIG. 16 shows a fourth embodiment of the present invention relating to a driving apparatus 152 employing a voltage detector 149 and a pulse-period modifier 150 in place of the interrupt counter) 137 and the pulse-period modifier 138 of the driving apparatus 130 shown in FIG. 9, respectively. The same reference numerals as used in FIG. 9 are used to designate the corresponding elements of the fourth embodiment shown in FIG. 16, and the repetitive description of those elements is omitted. The following description will be focused on the differences of the third and fourth driving apparatus 130, 152.

The voltage detector 149 may be provided by an analog to digital (A/D) converter or the like. The voltage detector 149 detects a current voltage of a full-wave rectified output of a full-wave rectifying circuit 132, and generates a voltage detection signal indicative of the detected current voltage of the full-wave rectified output. The pulse-period modifier 150 receives the voltage detection signal from the voltage detector 149, normalizes the detection signal, and modifies a reference pulse period to pre-stored in a ROM 143, into a modified pulse period proportional to the inverse of the normalized value of the detected current voltage represented by the voltage detection signal. More specifically described, the voltage detector 149 detects a current voltage of the full-wave rectified output at the time of commencement of each low-voltage state of a pulse signal Sb generated by a first timer 145. The driving apparatus 152 includes a one-chip microcomputer 151 having the same hardware construction as shown in FIG. 10. Based on the detected current voltage, the pulse-period modifier 150 provides a modified pulse period, t, according to the following expression:

$$t = (c/A) \cdot t0$$

where

A is the normalized value of the detected current voltage, and

C is a factor of proportionality.

Thus, the fourth driving apparatus 152 enjoys the same advantages as those with the third driving apparatus 130 of FIG. 9. In particular, the driving apparatus 152 is characterized in that the current voltage of the full-wave rectified output is detected and the detected current voltage is utilized for providing a modified pulse period t of the pulse signal Sc. Therefore, even when a source voltage of a commercial AC power supply 131 unexpectedly changes because of some reason, the driving apparatus 152 provides a modified pulse width t which compensates for the unexpected source-voltage change, thereby more effectively preventing the fluctuation of output torque of an electric motor 133.

Figure 17:
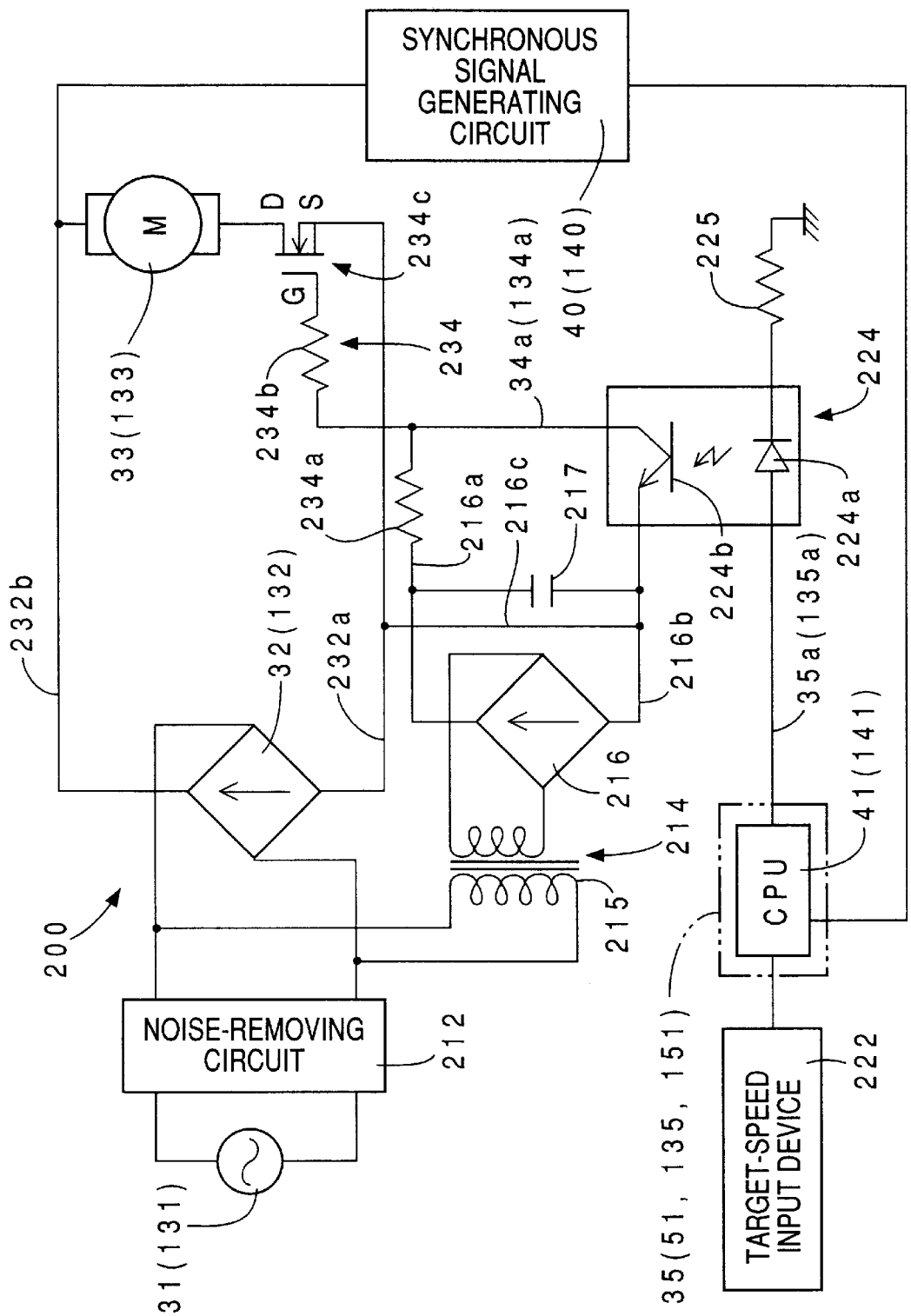
FIG. 17 is a view corresponding to FIG. 1, showing a driving apparatus as a fifth embodiment of the invention.

Referring next to FIG. 17, there is shown a motor driving apparatus 200 as a fifth embodiment of the present invention. The driving apparatus 200 includes the same AC power supply 31 or 131, (first) rectifying element 32 or 132, universal motor 33 or 133, control device 35, 51, 135, or 151, and synchronous-signal generating circuit 40 or 140 of the driving apparatus 30, 52, 130, or 152 as the first, second, third, or fourth embodiment of the invention shown in FIGS. 1, 8, 9, or 16, respectively, and the description of those elements is omitted. The driving device 200 includes a chopper 234 different from the chopper 34 or 134 of the first to fourth apparatus 30, 52, 130, or 152. The following description will be focused on the chopper 234 and other differences between the fifth embodiment and the first to fourth embodiments.

In the case where the control device 35 or 51 used in the first or second embodiment is employed in the fifth embodiment, the control device 35 or, 51 supplies a chopping pulse signal obtained by inverting a pulse signal as shown in FIG. 3(D), to a chopping element 234c of the chopper 234. Meanwhile, in the case where the control device 135 or 151 used in the third or fourth embodiment is employed in the fifth embodiment, the control device 135, 151 supplies a chopping pulse signal obtained by inverting a pulse signal as shown in FIG. 11(D), to the chopping element 234c of the chopper 234.

In FIG. 17, a noise-removing circuit 212 is provided between the (first) rectifying element 32 (132) and the AC supply 31 (131). A stable DC power source 214 is connected to the AC supply 31 (131). The DC source 214 includes a transformer 215, a second rectifying element 216, and a smoothing capacitor 217. The transformer 215 reduces the AC voltage of the AC supply 31 (131), and the second rectifier 216 and the smoothing capacitor 217 cooperate with each other to convert the thus reduced AC voltage into a stable DC voltage always higher by 5 V than the full-wave rectified output of the first rectifier 32 (132). A pull-up resistor 234a and a resistor 234b are connected to a positive line 216a of the second rectifier 216, and a negative line (i.e., ground, GND) 216b of the second rectifier 216 is connected via a bypass line 216c to a negative line (i.e., ground GND) 232a of the first rectifier 32 (132).

The chopping element 234c and the electric motor 33 (133) are connected in series to the negative line 232a and a positive line 232b of the first rectifier 32 (132). The chopping element 234c is a power MOS-FET (metal-oxide semiconductor field-effect-transistor). The electric motor 33 (133) is a universal motor. A gate, G, of the chopping element 234c is supplied with the stable 5 V DC voltage from the DC source 214, via the following path (A):

positive line 216a >> pull-up resistor 234a >>
resistor 234b >>chopping element 234c >>
negative line 232a >>by-pass line 216c >>
negative line 216b . . . (A)

The chopping element 234c cooperates with the pull-up resistor 234a and the resistance 234b to provide the chopper 234 of the driving apparatus 200 as the fifth embodiment. When the 5 V DC voltage is applied to the chopping element 234c of the chopper 234, the chopping element 234c chops the full-wave rectified output of the first rectifier 32 (132), as described later.

A target-speed input device 222 is connected to a CPU 41 (141) of the control device 35 (51, 135, 151). The target-speed input device 222 includes a speed-command key or dial (not shown) which is manually operable by an operator or user to input a desired target rotation speed of the electric motor 33 (133).

As shown in FIG. 17, the chopper 234 and the control device 35 (51, 135, 151) are electrically insulated from each other, and are connected to each other by a photocoupler 224 which includes a light emitting diode (LED) 224a connected to the CPU 41 (141). An electric-current control resistance 25 is also connected to the CPU 41 (141) via the LED 224a of the photocoupler 224. The photocoupler 224 additionally includes a phototransistor 224b whose emitter is connected to the negative line 216b of the second rectifier 216 and whose collector is connected to the gate G of the chopping element 234c via the resistor 234b. When the chopping pulse signal obtained by inverting the pulse signal of FIG. 3(D) or FIG. 11(D) takes a low-voltage state, the LED 224a stops emitting light, so that the phototransistor 224b inhibits an electric current from flowing throughit. Consequently the 5 V DC produced by the DC source 214 is applied to the gate G of the chopping element 234c through the previously mentioned path (A).

On the other hand, when the chopping pulse signal obtained by inverting the pulse signal of FIG. 3(D) or FIG. 11(D) takes a high-voltage state, the LED 224a emits light so that the phototransistor 224b permits an electric current to flow through it. Consequently the 5 V DC being applied to the gate G of the chopping element 234c is reduced to zero V. The phototransistor 224b is selectively placed in a first operation state in which the transistor 224b shuts off the electric current flowing through it, and in a second operation state in which the transistor 224b conducts the electric current. Thus, the phototransistor 224b of the photocoupler 224 is selectively placed in the first or second operation state so as to transmit the chopping pulse signal of FIG. 3(D) or FIG. 11(D) from the control device 35 (51, 135, 151) or CPU 41 (141) to the chopper 234 which is electrically insulated from the control device 35 (35, 135, 151). The photocoupler 224 functions as an insulator-type signal transmitter of the driving apparatus of the present invention.

The amount or intensity of light emission of the LED 224a depends on an electric current, IF, supplied to the LED 224a, and the electric current IF is defined according to the following expression:

$$IF=(E-VF)/R$$

where

E is a higher voltage of the output signal of the CPU 41 (141),

VF is a voltage drop at the LED 224a, and

R is a resistor value of the control resistance 225.

Therefore, it is preferred that the resistance value R of the current-control resistor 225 be selected at an appropriate value.

Next, there will be described the operation of the driving apparatus 200 constructed as described above. First, the operator or user inputs or sets his or her desired target rotation speed of the electric motor 33 (133), through the target-speed input device 222 having the target-speed key or dial. Based on the preset target rotation speed input through the input device 222, the CPU 41 (141) generates the chopping pulse signal of FIG. 3(D) or 11(D), and this chopping pulse signal is inverted by an inverter 47 or 147 shown in FIG. 2 or FIG. 10.

The CPU 41 (141) supplies the inverted chopping pulse signal to the photocoupler 224, so that the LED 224a of the photocoupler 224 goes on and off according to the low- and high-voltage states of the chopping pulse signal. Then, the phototransistor 224b of the photocoupler 224 conducts or stops the electric current in response to the going on and off of the LED 224a, respectively. Consequently the chopping element 234c directly chops the full-wave rectified output of the first rectifier 32 (132) in response to the electric- current conducting and stopping of the phototransistor 224b.

When the chopping pulse signal obtained by inverting the pulse signal of FIG. 3(D) or FIG. 11(D) takes, for example, a low-voltage state, the LED 224a stops light emission, and the phototransistor 224b shuts off the electric current flowing through it, so that the 5 V DC is applied to the gate G of the chopping element 234c through the previously mentioned path (A). As a result, an electric short takes place between a drain, D, and a source, S, of the chopping element 234c, and the voltage between the drain S and source S of the chopping element 234c takes a low-voltage state. Since the voltage applied to the electric motor 33 (133) is obtained by subtracting the voltage between the drain D and source S of the chopping element 234c from the voltage waveform of FIG. 3(A) or 11(A), the full-wave rectified output of the first rectifier 32 (132) is directly applied to the electric motor 33 (133), in this situation.

On the other hand, when the chopping pulse signal takes a high-voltage state, the LED 224a emits light, and the phototransistor 224b conducts the electric current, so that the direct current being applied to the gate G of the chopping element 234c drops from 5 V. As a result, no electric current flows between the drain D and source S of the chopping element 234c, and the voltage between the drain S and source S of the chopper element 234c takes a high-voltage state. In this situation, the voltage waveform across the drain D and source S of the chopping element 234c is identical with the voltage waveform of FIG. 3(A) or FIG. 11(A) as the full-wave rectified output of the first rectifier 32 (132). Therefore, no electric current is applied to the electric motor 33 (133).

Thus, the chopper 234 chops the full-wave rectified output of the first rectifier 32 (132) according to the chopping pulse signal generated by the control device 35 (51, 135, 151) and transmitted by the photocoupler 224, so that the electric motor 33 (133) operates or rotates under supply of the voltage waveform obtained by subtracting the waveform across the chopping element 234c from the waveform of FIG. 3(A) or FIG. 11(A). FIG. 4 or FIG. 12 shows a waveform of an electric current flowing through the electric motor 33 or 133.

In the fifth embodiment, the chopping pulse signal obtained by inverting the pulse signal of FIG. 3(D) or FIG. 11(D) has a high frequency of 20 KHz, so that the high frequency-switched (or -chopped) voltage waveform is applied to the electric motor 33 (133). Thus, the voltage applied to the electric motor 33 (133) has a continuous and appreciably constant waveform as indicated at broken line in FIG. 4 or FIG. 12, as compared with the intermittent and highly variable voltage waveform of FIG. 20(D) applied to the electric motor 4 under control of the conventional driving apparatus shown in FIG. 19. Therefore, the present driving apparatus 200 largely reduces the vibration of the electric motor 33 (133), thereby reducing the vibration of a framework of the sewing machine in which the electric motor 33 (133) is accommodated, and reducing the noise audible by the operator or user. A test shows that, when a universal motor 33 (133) is rotated at 110 rpm by the present driving apparatus 200, the detected noise level is 51 dB that is lower by as much as 6 dB than the 57 dB noise level detected from a universal motor driven by the conventional driving apparatus of FIG. 19.

In response to both constant load changing (e.g., vertical reciprocation of the needle bar) and abrupt load changing (e.g., sticking of the needle into or through the work sheet) on the sewing machine, the present driving apparatus 200 produces the chopping pulse signal obtained by inverting the pulse signal of FIG. 3(D) or 11(D), on a real-time basis, so that the chopper 234 effectively follows the chopping pulse signal and the electric motor 33 (133) quickly responds to each load changing on a real-time basis.

Since neither a vibration absorber such as a rubber member nor an exclusive DC power supply is needed according to the present invention, the driving apparatus 200 is free from the conventionally encountered problems that the production cost is increased due to the employment of the vibration absorber and that both the overall size and the production cost are increased due to the employment of the exclusive DC power supply. Although it may be seen that the total number of parts of the driving apparatus 200 of FIG. 17 may be increased as compared with that of the conventional driving apparatus of FIG. 19, it is possible to reduce the number of parts of the present apparatus 200. For example, the first and second rectifiers 32 (132) and 216 may be provided by a small single part or element, and the transformer 215 may be obtained by winding a coil around a transformer which is employed to operate the CPU 41 (141) of the control device 35 (51, 135, 151). Thus, there is substantially no increase in the number of parts of the driving apparatus 200 of FIG. 17 as compared with the conventional apparatus of FIG. 19.

The electric current flowing through the electric motor 33 (133) may contain a frequency component resulting from the pulse signal of FIG. 3(D) or FIG. 11(D). This frequency component can be minimized, and the vibration of the electric motor 33 (133) resulting from this frequency component can effectively be reduced by maximizing the frequency of the pulse signal. In view of this principle, it is experimentally found that a chopping signal having a not less than 10 KHz frequency is practically employable for the purpose of sufficiently reducing the vibration of a common sewing machine, because of the specific mechanical construction of the sewing machine. Further, in view of the switching performance of the power MOS-FET used as the chopper element 234c, the present driving apparatus 200 uses the chopping pulse signal with the 20 KHz frequency that exceeds the upper limit of the human audible frequency range, thereby effectively reducing the noise audible by the operator or user.

Figure 19:
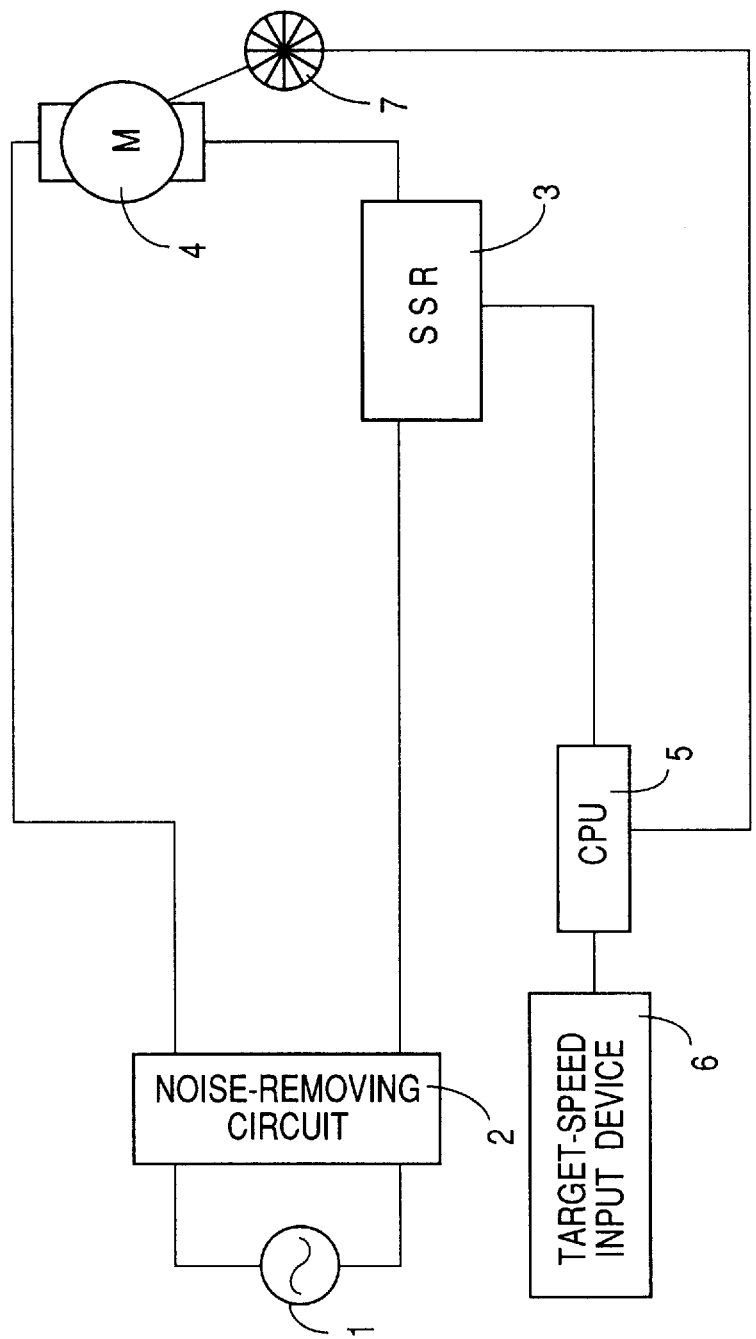
FIG. 19 is a view of a prior motor driving apparatus.
Figure 20:
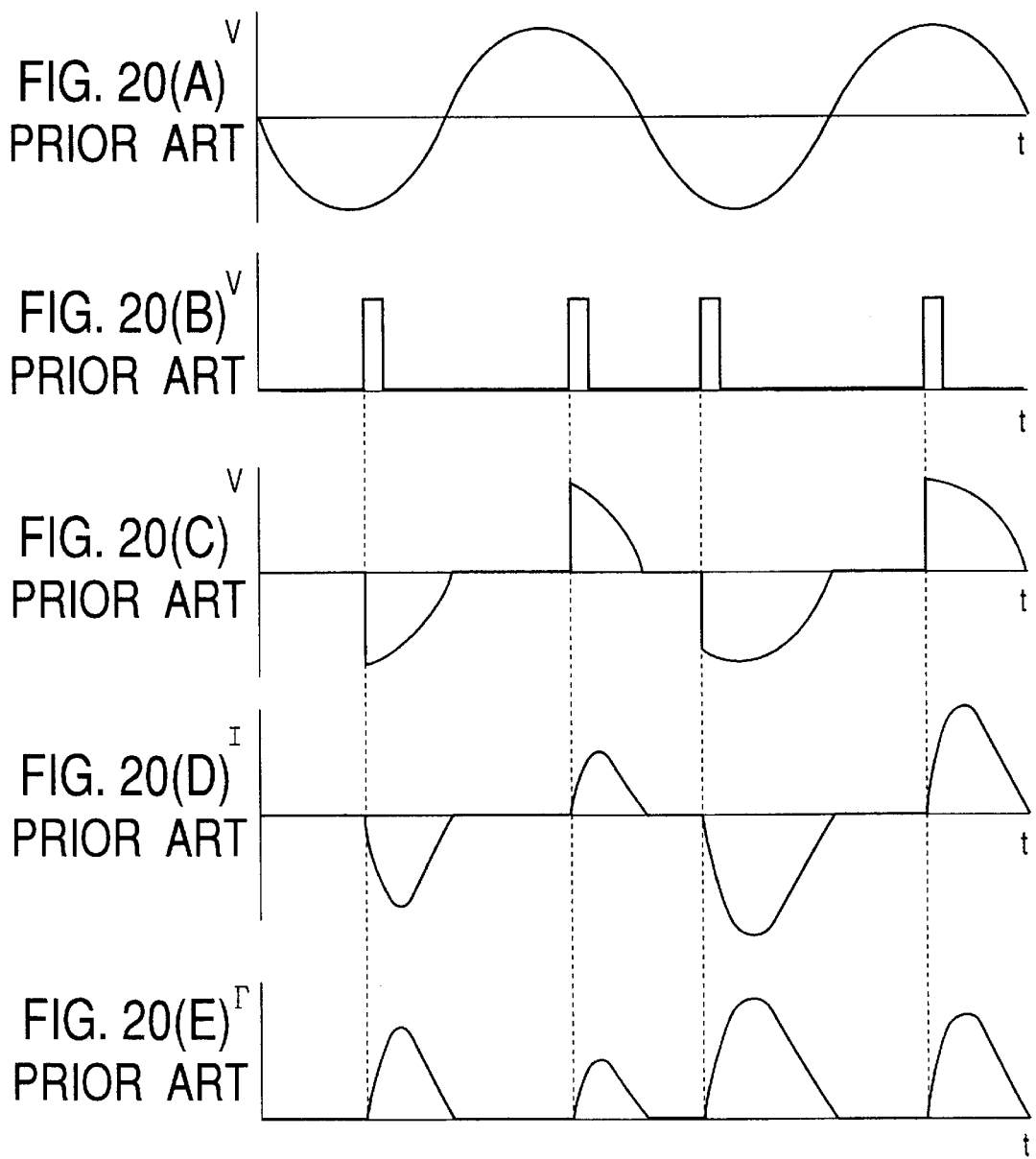
FIG. 20(A) is a graph showing a voltage waveform of an AC output of a commercially available AC power supply of the apparatus of FIG. 19.
FIG. 20(B) is a graph showing an ON signal supplied from a CPU to a solid-state relay in the apparatus of FIG. 19.
FIG. 20(C) is a graph showing a voltage waveform applied to an electric motor by the apparatus of FIG. 19.
FIG. 20(D) is a graph showing a waveform of an electric current flowing through the electric motor driven by the apparatus of FIG. 19.
FIG. 20(E) is a graph showing an intermittent output torque of the electric motor driven by the apparatus of FIG. 19.
Figure 21:
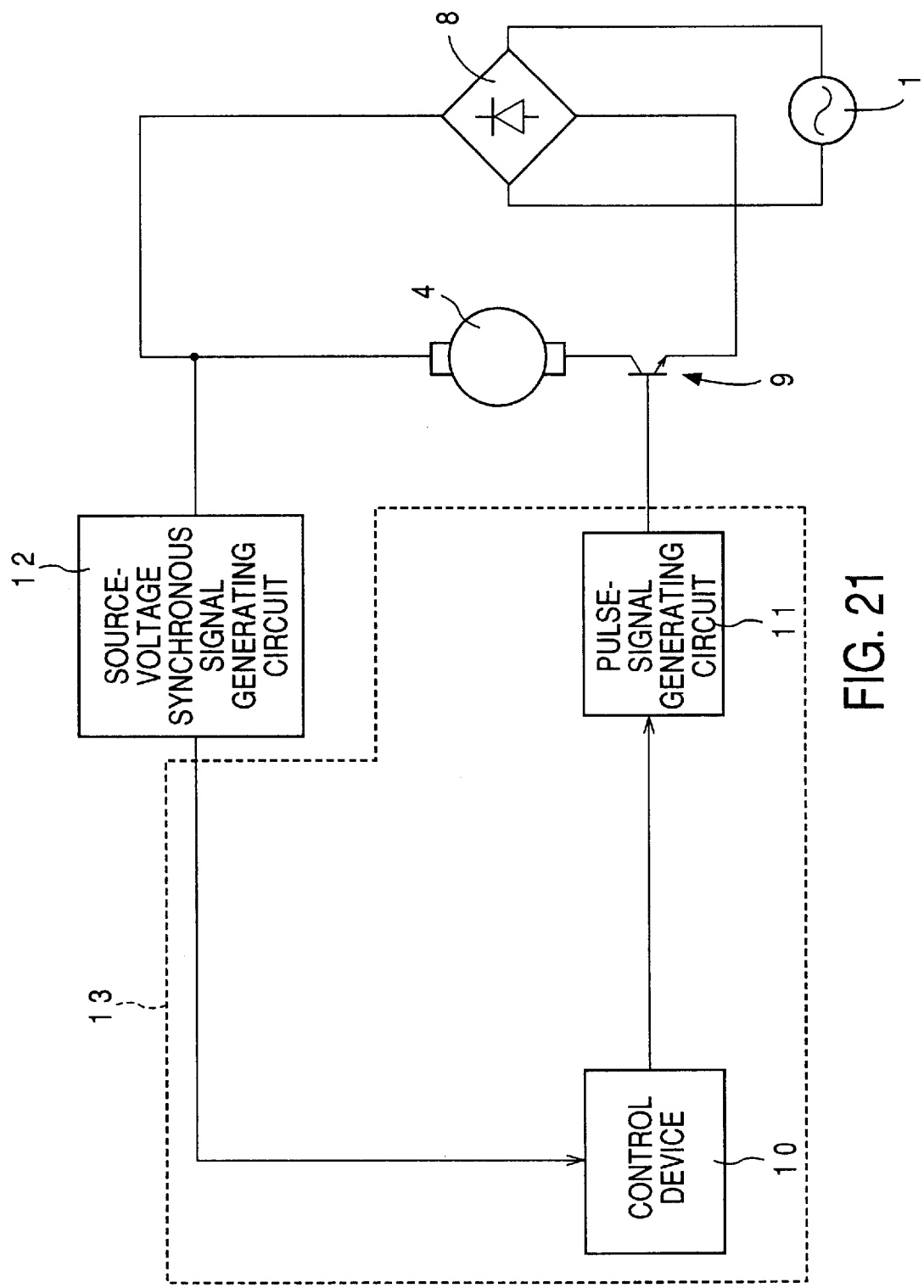
FIG. 21 is a view corresponding to FIG. 1, showing a motor driving apparatus that does not incorporate all of the novel aspects of this invention.
Figure 22:
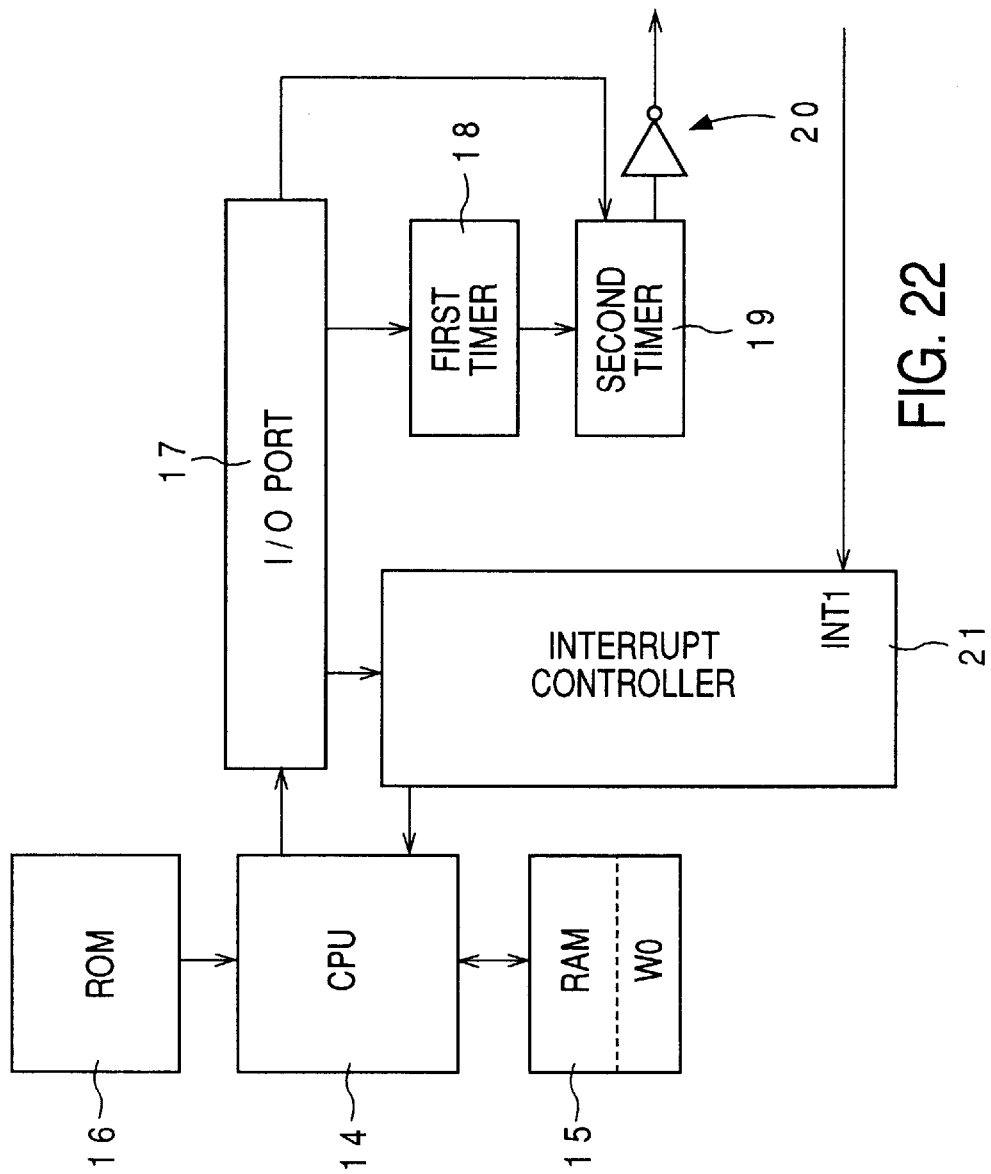
FIG. 22 is a view corresponding to FIG. 2, showing an electronic arrangement of a one-chip microcomputer employed in the apparatus of FIG. 21.
Figure 23:
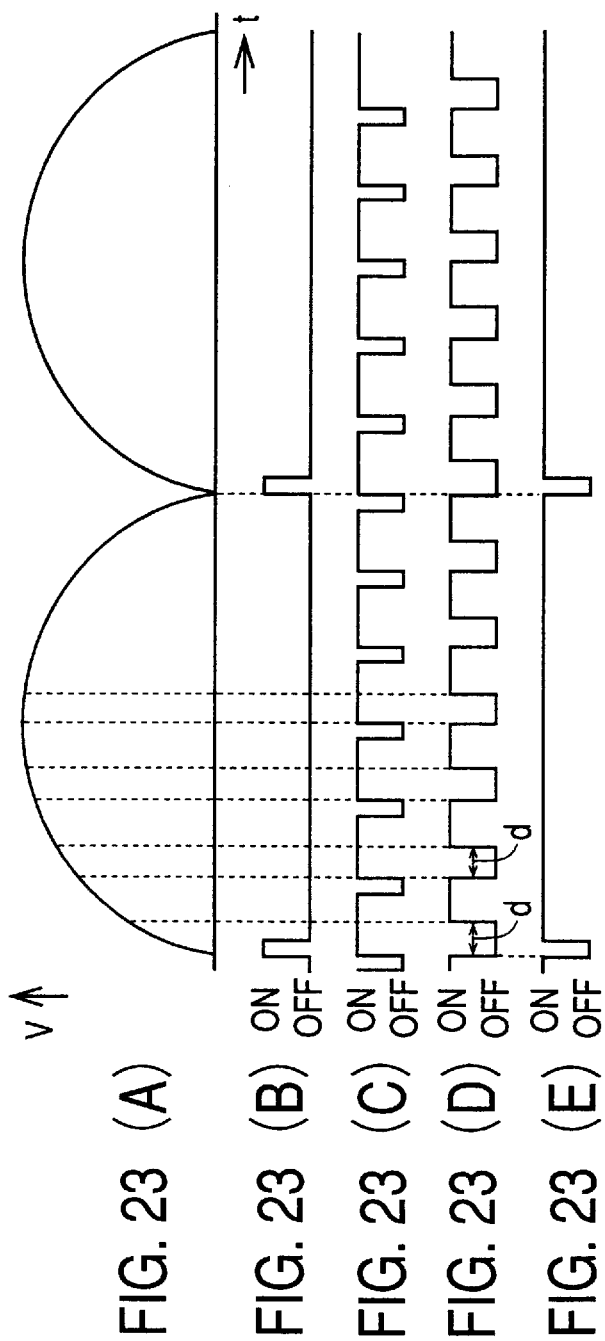
FIG. 23(A) is a graph showing a voltage waveform of a full-wave rectified output of a rectifying circuit of the apparatus of FIG. 21.
FIG. 23(B) is a graph showing a synchronous signal generated by a synchronous-signal generating circuit of the apparatus of FIG. 21.
FIG. 23(C) is a graph showing a pulse signal generated by a first timer of the microcomputer of FIG. 22.
FIG. 23(D) is graph showing an inverted pulse signal generated by a second timer of the microcomputer of FIG. 20.
FIG. 23(E) is a graph showing a signal used to control a timing at which a low-voltage-state length d is written in the second timer.
Figure 24:
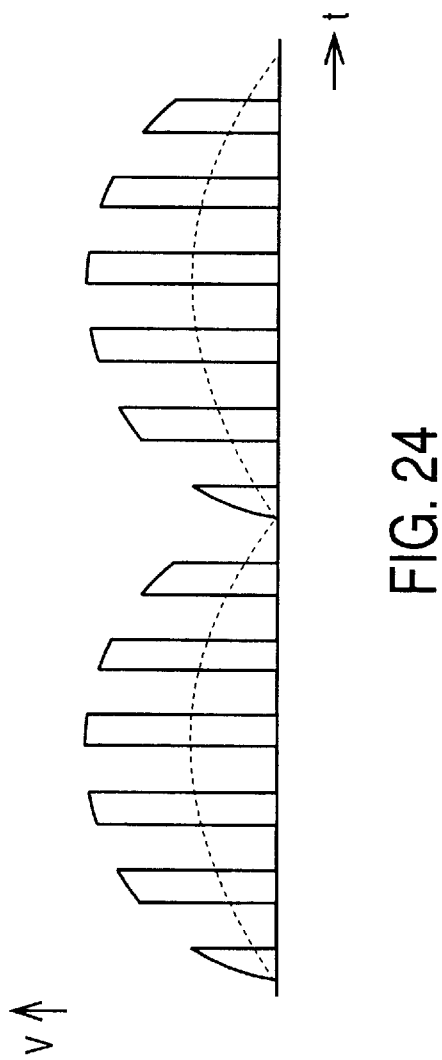
FIG. 24 is a graph showing a voltage waveform supplied to an electric motor driven by the apparatus of FIG. 21.

In the conventional driving apparatus shown in FIG. 19, the solid-state relay 3 is employed for controlling the phase of voltage waveform applied to the universal motor 4, as shown in FIG. 19(B). When the CPU 5 applies, to the relay 3, an ON signal having a prescribed potential difference, $V_b$, with respect to a voltage, $V_a$, between the two terminals of the relay 3, the relay 3 carries out a switching operation. Thus, it is not required to electrically insulate the side of the CPU 5 and the side of the relay 3 from each other when the ON signal is applied to the relay 3. On the other hand, in the present embodiment wherein the power MOS-FET as the chopper element 234c carries out the switching operation, it is required to apply, to the gate, G, of the FET, a signal having a prescribed potential difference with respect to the potential of the source, S, of the FET (in the present embodiment, potential of the ground GND). To this end, the photocoupler 224 is used to transmit the chopping pulse signal generated by the CPU 41 (141), to the chopper 234, under the condition that the CPU 41 (141) and the chopper 234 are electrically insulated from each other. The stable output of the DC source 214 (having the voltage with the prescribed potential difference with respect to the potential of the source S) being applied to the gate G of the chopper element 234c is controlled according to the chopping pulse signal thus transmitted to the chopper 234.

In addition to the function of transmitting the chopping signal to the chopper 234, the photocoupler 224 has another important function as described below. In the sewing machine, the ground GND on the secondary side thereof on which the control device 35 (51, 135, 151) is provided, is connected to the framework thereof, in view of the problems of noise and static electricity, while one of supply terminals thereof for the AC supply 31 (131) is earthed via a ground (GND) line. Since the control device 35 (51, 135, 151) is electrically insulated by a transformer, the ground GND line of a secondary power source for the CPU 41 (141) contacts the earth via the framework of the sewing machine, with no problem. However, if the photocoupler 224 is omitted, an electric short occurs because the ground GND line of the full-wave rectified output for driving the electric motor 33 (133) contacts the earth by bypassing the transformer for the control device 35 (51, 135, 151). In the fifth embodiment, however, the photocoupler 224 is employed to prevent the electric-short hazard. Thus, the present driving apparatus 200 enjoys high safety in addition to the above described advantages with the first to fourth embodiments.

While the present invention has been described in its preferred embodiment, it is to be understood that the present invention may be otherwise embodied.

For example, while in the illustrated embodiments the 20 KHz chopping frequency is employed, the principle of the present invention is by no means limited to the specific chopping frequency. For the previously described reasons, it is possible to select an appropriate chopping frequency within a frequency range not less than 10 KHz. Experiments show that it is preferable to select the chopping frequency within the 16 to 24 KHz frequency range, more preferably within the 17 to 23 frequency range, and most preferably within the 19 to 22 KHz frequency.

Although in the illustrated embodiments a transistor is used as the chopping element 234c, it is possible to use other sorts of chopping elements.

While in the illustrated embodiments an universal motor is used as the electric motor 33 (133), it is possible to use other sorts of electric motors such as a DC motor or a DC brushless motor. That is, the present invention is applicable to any sort of electric motor whose rotation is controllable in accordance with a DC voltage. In particular, in the case where a DC motor is used as the electric motor 33 (133), it is preferred to provide and connect a diode between and to the lines 232a and 232b in parallel to the DC motor 33 (133). In this case, when a counter electromotive force is produced between the two ends of the electric motor 33 (133) so that the drain voltage of the chopping element 234c is likely to exceed the voltage of the AC supply 31 (131), the diode permits an electric current to flow therethrough, thereby effectively preventing such a counter electromotive force which exceeds the upper limit voltage which the chopping element 234c can withstand, from being applied to the chopping element 234c.

Although in the fifth embodiment the stable DC power source 214 is provided by the transformer 215, the second rectifier 216, and the smoothing capacitor 217, it is otherwise possible to employ a Zener diode, a resistor, a capacitor, etc. for utilizing an output of the first rectifier 32 (132) to provide a stable DC voltage to be applied to the chopping element 234c.

While in the illustrated embodiments the driving apparatus 30, 52, 130, 152, or 200 is used for driving the electric motor 33 (133) employed in a sewing machine, the principle of the present invention is widely applicable to drive various sorts of electric motors employed in various sorts of machines such as an electric tool (e.g., electric drill) or a household or home-use electric appliance (e.g., vacuum cleaner).

Figure 18:
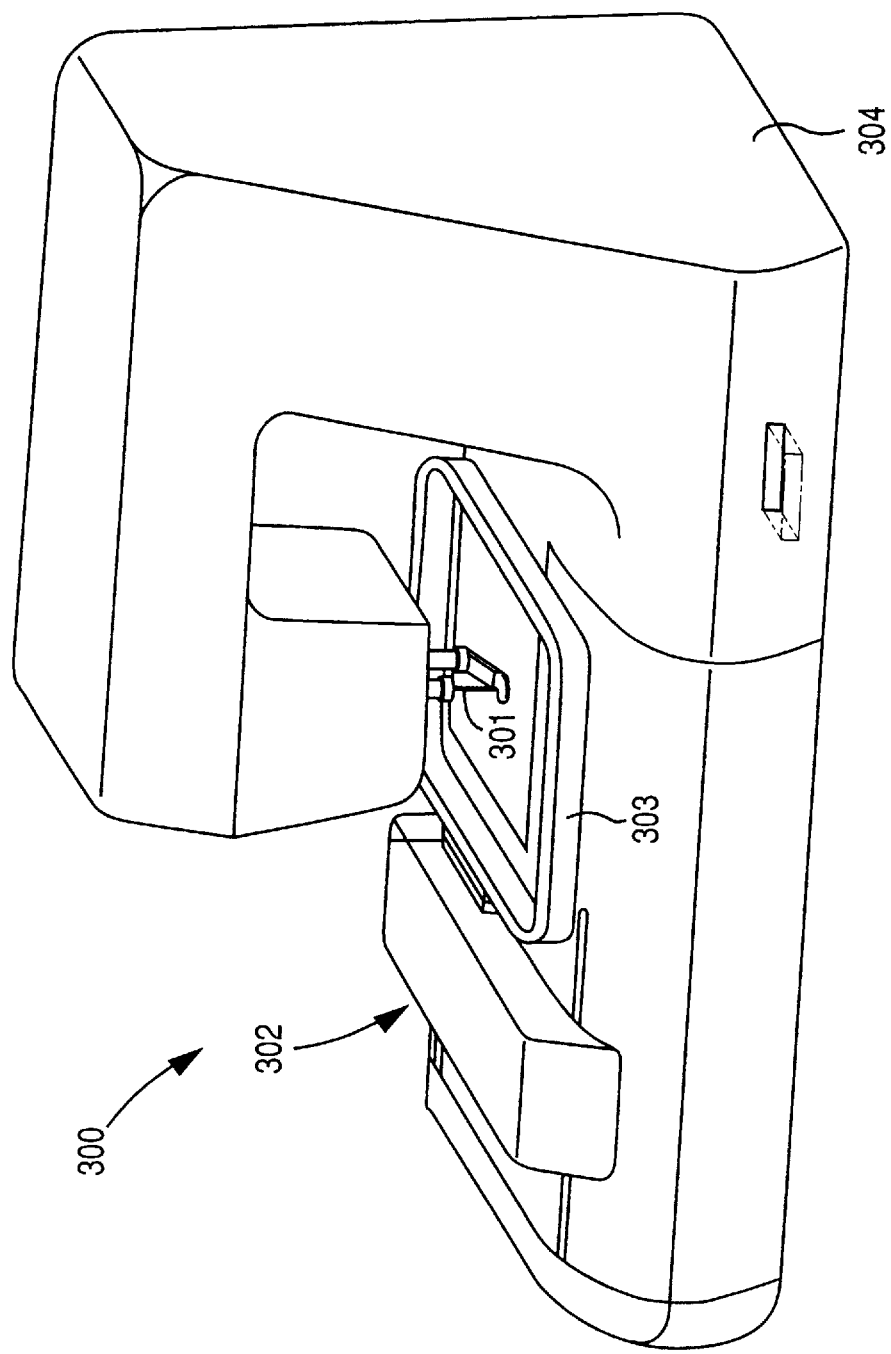
FIG. 18 is a view of a sewing machine incorporating a driving apparatus in accordance with the present invention.

FIG. 18 shows a sewing machine 300 in which the driving apparatus 30, 52, 130, 152, or 200 is incorporated. The sewing machine 300 has a sewing needle 301 secured to a needle bar, and an X-Y feeding device 302 for feeding a work holder 303 in an X-Y plane. The work holder 303 holds a work sheet to be sewn by the sewing machine 300. The driving apparatus 30, 52, 130, 152, or 200 effectively reduces the vibration generated by the electric motor 33, 133 and transmitted to a framework 304 of the sewing machine 300, thereby also reducing the noise audible by a user or operator.

It is to be understood that the present invention may be embodied with other changes, improvements, and modifications that may occur to those skilled in the art without departing from the spirit and scope of the invention defined in the appended claims.

What is claimed is:

1. An apparatus for controllably driving an electric motor powered by an alternating current power supply, the apparatus comprising:

a full wave rectifying circuit which rectifies an alternating current of an alternating electric signal supplied by the alternating current power supply and outputs an initial full wave rectified signal having an initial full wave rectified current that includes a plurality of cyclic waves corresponding a plurality of half cycles of the alternating electric signal, respectively;

a current supply circuit which supplies a pulse width modulated full wave rectified current to the electric motor by controllably interrupting the supply of each of the cyclic waves of the initial full wave rectified current during an entire interval of each of said cyclic waves to the electric motor based on a pulse width modulation signal, so that the electric motor is supplied with an electric current having a substantially constant magnitude during a substantially entire interval of each of said cyclic waves; and a current supply control circuit which generates and outputs the pulse width modulation signal to the current supply circuit, the current supply control circuit generating the pulse width modulation signal based on a selected motor control target value and a counted value, the counted value indicative of a state of the initial full wave rectified signal.

2. The apparatus of claim 1, wherein:

the pulse width modulated signal has a predetermined pulse frequency; and the current supply control circuit determines a nominal pulse width for the pulse width modulated signal based on the selected motor control target value.

3. The apparatus of claim 2, wherein the current supply control circuit modifies the nominal pulse width for a current pulse of the pulse width modulated signal based on a selected one of a plurality of predetermined correction factor values, the selected one of the plurality of predetermined correction factor values selected based on the counted value.

4. The apparatus of claim 1, wherein:

the current supply control circuit determines a nominal pulse width for the pulse width modulated signal based on the selected motor control target value;

the current supply control circuit determines a correction factor as a function of a current value of the counted value; and the current supply control circuit modifies the nominal pulse width for a current pulse of the pulse width modulated signal based on the correction factor.

5. The apparatus of claim 4, wherein the correction factor $c(n)$ is determined as:

$$c(n)=2/(|\sin\ (p(n+1))|+|\sin\ (p(n+2))|);\ and$$

$$p(n)=2*\pi*n*(f_1/f_2),$$

where:

n is the counted value;

$f_1$ is a frequency of the alternating current signal; and $f_2$ is the predetermined pulse frequency of the pulse width modulated signal.

6. The apparatus of claim 1, wherein:

the current supply control circuit determines a nominal pulse width for the pulse width modulated signal based on the selected motor control target value; and the current supply control circuit selects one of a plurality of predetermined pulse period values based on the counted value as a current pulse period of the pulse width modulated signal.

7. The apparatus of claim 1, wherein:

the current supply control circuit determines a nominal pulse width for the pulse width modulated signal based on the selected motor control target value; and the current supply control circuit determines a modified pulse period for the pulse width modulated signal based on the counted value and a predetermined nominal pulse period.

8. The apparatus of claim 7, wherein the modified pulse period $t(n)$ is determined as:

$$t(n)=t0*(a+|\sin\ (p(n))|);$$

$$p(n+1)=p(n)+2*\pi*t(n)*f;\ and$$

$$0 \leq p(n) \leq \pi;$$

where:

t0 is the predetermined nominal pulse period;

a is a constant;

n is the counted value; and f is a frequency of the alternating current signal supplied by the alternating current power supply.

9. The apparatus of claim 1, further comprising a synchronous signal generating circuit connected to the full wave rectifying circuit and generating and outputting a reset signal to the current supply control circuit when the full wave rectified signal has a predetermined reset value.

10. The apparatus of claim 9, wherein the predetermined reset value is 0V.

11. The apparatus of claim 9, wherein the counted value is indicative of a number of events occurring since the reset signal.

12. The apparatus of claim 9, wherein the counted value is reset to a predetermined value in response to the reset signal.

13. The apparatus of claim 9, wherein the current supply control circuit determines a nominal pulse width based on the selected motor control target value, the current supply control circuit inputting a current value for the selected motor control target value and redetermining the nominal pulse width in response to the reset signal.

14. The apparatus of claim 9, wherein the current supply control circuit comprises:

an interrupt counter which counts the counted value, the counted value indicative of a number of interrupts since the reset signal; and a control device which determines a nominal pulse width for the pulse width modulated signal based on the selected motor control target value.

15. The apparatus of claim 14, wherein the current supply control circuit further comprises:

a pulse-width modifier which determines a modified pulse width by modifying the nominal pulse width determined by the control device based on the counted value counted by the interrupt counter; and a pulse signal generator which generates the pulse width modulated signal and outputs the pulse width modulated signal to the current supply circuit, a current pulse of the pulse width modulated signal having a predetermined frequency and the modified pulse width.

16. The apparatus of claim 14, wherein the current supply control circuit further comprises:

a pulse-width modifier which determines a modified pulse period based on the counted value counted by the interrupt counter and a predetermined nominal pulse period; and a pulse signal generator which generates the pulse width modulated signal and outputs the pulse width modulated signal to the current supply circuit, a current pulse of the pulse width modulated signal having the modified pulse period and the nominal pulse width.

17. The apparatus of claim 1, wherein the current supply control circuit comprises:

a rate pulse generator which generates a rate pulse signal having a reference pulse width and a reference pulse period, the reference pulse period being less than a period of the alternating current signal supplied by the alternating current power supply;

a rate counter which counts the counted value, the counted value indicative of a number of rate pulses since a reset signal, the reset signal generated in response to the initial full wave rectified signal having a selected value;

a control device which determines a nominal pulse width for the pulse width modulated signal based on the selected motor control target value;

a pulse-width modifier which determines a modified pulse width by modifying the nominal pulse width determined by the control device based on the counted value counted by the rate counter; and a pulse signal generator which generates the pulse width modulated signal and outputs the pulse width modulated signal to the current supply circuit, a current pulse of the pulse width modulated signal having the reference pulse period and the modified pulse width.

18. The apparatus of claim 1, wherein the current supply control circuit comprises:

a phase counter which counts the counted value, the counted value indicative of a current phase of the initial full wave rectified signal; and a control device which determines a nominal pulse width for the pulse width modulated signal based on the selected motor control target value.

19. The apparatus of claim 18, wherein the current supply control circuit further comprises:

a pulse-width modifier which determines a modified pulse width by modifying the nominal pulse width determined by the control device based on the counted value counted by the phase counter; and a pulse signal generator which generates the pulse width modulated signal and outputs the pulse width modulated signal to the current supply circuit, a current pulse of the pulse width modulated signal having a predetermined frequency and the modified pulse width.

20. The apparatus of claim 18, wherein the current supply control circuit further comprises:

a pulse-width modifier which determines a modified pulse period based on the counted value counted by the phase counter and a predetermined nominal pulse period; and a pulse signal generator which generates the pulse width modulated signal and outputs the pulse width modulated signal to the current supply circuit, a current pulse of the pulse width modulated signal having the modified pulse period and the nominal pulse width.

21. The apparatus of claim 1, wherein the current supply control circuit comprises:

a processor unit;

an alterable memory connected to the processor unit;

an interrupt controller connected to an input of the processor unit;

a input/output device, a first input of the input/output device connected to a data output of the processor unit, a first output of the input/output device connected to a first input of the interrupt controller, a second output of the input/output device connected to a first interrupt input of the interrupt controller, and a third output of the input/output device connected to the current supply circuit;

a first timer, a first input of the first timer connected to a fourth output of the input/output device, a second input of the first timer connected to the second output of the input/output device and a first output of the first timer connected to a second interrupt input of the interrupt controller;

a second timer, a first input of the second timer connected to a second output of the first timer, a second input of the second timer connected to a fifth output of the input/output device and an output of the second timer connected to a second input of the input/output device.

22. The apparatus of claim 21, wherein the processor unit determines a nominal pulse width value for the pulse width modulated signal based on the selected motor control target value.

23. The apparatus of claim 22, wherein the processor unit determines a modified pulse width value for the pulse width modulated signal based on the nominal pulse width value and the counted value and outputs the modified pulse width value to the input/output device.

24. The apparatus of claim 23, wherein the modified pulse width value input to the input/output device is output to the second timer and stored by the second timer in response to a first pulse signal output by the first timer on the second output.

25. The apparatus of claim 24, wherein the second timer is triggered to output a second pulse signal by the first pulse signal, the second timer outputting, to the fifth output of the input/output device, the second pulse signal until the second timer counts the modified pulse width value, the input/output device outputting the second pulse signal to the current supply circuit.

26. The apparatus of claim 22, wherein the nominal pulse width value is stored in the alterable memory.

27. The apparatus of claim 22, wherein the first timer is supplied with a first count value corresponding to a period of the pulse width modified signal, the first timer outputting a first pulse signal to the second interrupt input of the interrupt controller and the first input of the second timer each time the first timer counts the first count value.

28. The apparatus of claim 27, wherein:

the counted value is stored in the alterable memory; and the processor unit increments the counted value stored in the alterable memory each time the first pulse signal is output from the first timer to the second interrupt input of the interrupt controller.

29. The apparatus of claim 28, wherein the processor unit determines a modified pulse width value based on the counted value and the nominal pulse width value, and outputs the modified pulse width value to the input/output device in response to the first pulse signal being input to the second interrupt input of the interrupt controller.

30. The apparatus of claim 29, wherein:

a plurality of correction factors are stored in a memory of the current supply control circuit; and the processor unit selects one of the plurality of correction factors based on the counted value stored in the alterable memory and calculates the modified pulse width value based on the selected correction value and the nominal pulse width value.

31. The apparatus of claim 30, wherein the memory is a ROM.

32. The apparatus of claim 29, wherein the processor unit calculates the modified pulse width value based on the nominal pulse width value and a current correction factor c(n), wherein:

$$c(n)=2/(|\sin (p(n+1))|+|\sin (p(n+2))|); \text{ and}$$

$$p(n)=2*\pi*n*(f_1/f_2),$$

where:

n is the counted value;

$f_1$ is a frequency of the alternating current signal; and $f_2$ is a frequency of the pulse width modulated signal.

33. The apparatus of claim 27, wherein the first count value is fixed and corresponds to a predetermined pulse period of the pulse width modulated signal.

34. The apparatus of claim 22, wherein the processor unit determines a current pulse period value based on the counted value and outputs the current pulse period value to the input/output device in response to a first pulse signal output by the first timer being input to the second interrupt input of the interrupt controller.

35. The apparatus of claim 34, wherein the current pulse period value input to the input/output device is output to the first timer and stored by the first timer as the first count value in response to the first pulse signal being output by the first timer.

36. The apparatus of claim 35, wherein the nominal pulse width value is output to the input/output device in response to a signal input to the first interrupt input of the interrupt controller, the nominal pulse width value output from the input/output device to the second timer and stored in the second timer.

37. The apparatus of claim 36, wherein the second timer is triggered to output a second pulse signal by the first pulse signal, the second timer outputting the second pulse signal until it counts the nominal pulse width value.

38. The apparatus of claim 34, wherein:

a plurality of pulse period values are stored in a memory of the current supply control circuit; and the processor unit selects one of the plurality of pulse period values as the current pulse period value based on the counted value.

39. The apparatus of claim 38, wherein the memory is a ROM.

40. The apparatus of claim 34, wherein the counted value is stored in the alterable memory; and the processor unit calculates the current pulse period value t(n) based on the counted value and a predetermined pulse period, wherein:

$$t(n)=t0*(a+\frac{1}{2} \sin (p(n))^{\frac{1}{2}});$$

$$p(n+1)=p(n)+2*p*t(n)*f; \text{ and}$$

$$0 \leq p(n) \leq p;$$

where:

t0 is the predetermined pulse period;

a is a constant;

n is the counted value; and f is a frequency of the alternating current supplied by the alternating current power supply.

41. The apparatus of claim 21, further comprising a synchronous signal generating circuit connected to the full wave rectifying circuit and generating a reset signal when the voltage of the initial full wave rectified signal has a predetermined reset value, the synchronous signal generating circuit outputting the reset signal to a third input of the input/output device.

42. The apparatus of claim 41, wherein: the counted value is stored in the alterable memory;

the processor unit increments the counted value stored in the alterable memory each time the first pulse signal is output from the first timer to the second interrupt input of the interrupt controller; and the processor unit resets the counted value to a predetermined value in response to the reset signal.

43. The apparatus of claim 1, wherein the current supply control circuit outputs, as a nominal pulse period for a current pulse of the pulse width modulated signal, a selected one of a plurality of predetermined pulse periods, the selected one of the plurality of predetermined pulse periods selected based on the counted value.

44. The apparatus of claim 1, wherein:

the current supply control circuit determines a nominal pulse width for the pulse width modulated signal based on the selected motor control target value;

the current supply control circuit selects one of a plurality of predetermined correction values based on the counted value;

the current supply control circuit modifies the nominal pulse width based on the selected predetermined correction value; and the current supply control circuit outputs the pulse width modulated signal having the modified pulse width.

45. A method for controllably driving an electric motor powered by an alternating current power supply, the method comprising:

rectifying an alternating current of an alternating electric signal supplied by the alternating current power supply to generate an initial full wave rectified signal having an initial full wave rectified current that includes a plurality of cyclic waves corresponding to a plurality of half cycles of the alternating electric signal, respectively;

generating and outputting a pulse width modulation signal based on a selected motor control target value and one of a counted value, the counted value being based on a state of the initial full wave rectified signal, and a voltage of the initial full wave rectified signal; and supplying a pulse width modulated full wave rectified current to the electric motor by controllably interrupting the supply of each of the cyclic waves of the initial full wave rectified current during an entire interval of each of said cyclic waves to the electric motor based on a pulse width modulation signal, so that the electric motor is supplied with an electric current having a substantially constant magnitude during a substantially entire interval of each of said cyclic waves.

46. The method of claim 45, wherein the pulse width modulated signal generating and outputting step comprises determining a nominal pulse width based on a selected motor control target value, the pulse width modulated signal having a predetermined pulse frequency.

47. The method of claim 46, wherein the pulse width modulated signal generating and outputting step further comprises:

selecting one of a plurality of predetermined correction factor values based on the one of the counted value and the detected voltage; and modifying the nominal pulse width for a current pulse of the pulse width modulated signal based on the selected one of the plurality of predetermined correction factor values.

48. The method of claim 46, wherein the pulse width modulated signal generating and outputting step further comprises:

determining a correction factor as a function of the current value of the one of the counted value and the detected voltage; and modifying the nominal pulse width for a current pulse of the pulse width modulated signal based on the determined correction factor.

49. The method of claim 48, wherein:

the pulse width modulated signal is generated based on the selected motor control target value and the counted value; and the correction factor determining step comprises determining the correction factor $c(n)$ as:

$$c(n)=2/(|\sin(p(n+1))|+|\sin(p(n+2))|); \text{ and}$$

$$p(n)=2*\pi*n*(f_1/f_2),$$

where:

n is the counted value;

$f_1$ is a frequency of alternating current signal; and $f_2$ is the predetermined pulse frequency of the pulse width modulated signal.

50. The method of claim 48, wherein:

the pulse width modulated signal is generated based on the selected motor control target value and the detected voltage; and the modified pulse width W is determined as:

$$W=(c/A)*W0$$

where:

W0 is the nominal pulse width;

A is a normalized value of the detected voltage; and c is a constant.

51. The method of claim 46, wherein the pulse width modulated signal generating and outputting step further comprises:

selecting one of a plurality of predetermined pulse period values based on the one of the counted value and the voltage of the initial full wave rectified signal; and generating a current pulse of the pulse width modulated signal having the nominal pulse width and the selected one of the plurality of predetermined pulse period values.

52. The method of claim 46, wherein the pulse width modulated signal generating and outputting step further comprises:

determining a modified pulse period for the pulse width modulated signal based on a predetermined nominal pulse period and the one of the counted value and the voltage of the initial full wave rectified signal; and generating a current pulse of the pulse width modulated signal having the nominal pulse width and the determined modified pulse period value.

53. The method of claim 52, wherein:

the pulse width modulated signal is generated based on the selected motor control target value and the counted value; and the modified pulse period $t(n)$ is determined as:

$$t(n)=t0*(a+\tfrac{1}{2}\sin(p(n))\tfrac{1}{2});$$

$$p(n+1)=p(n)+2*p*t(n)*f; \text{ and}$$

$$0 \leq p(n) \leq p;$$

where:

t0 is the predetermined nominal pulse period;

a is a constant;

n is the counted value; and f is a frequency of the alternating current supplied by the alternating current power supply.

54. The method of claim 52, wherein:

the pulse width modulated signal is generated based on the selected motor control target value and the voltage of the initial full wave rectified signal; and the modified pulse period t is determined as:

$$t=(c*A)*t0$$

where:

t0 is the predetermined nominal pulse period;

A is a normalized value of the detected voltage; and c is a constant.

55. The method of claim 45, further comprising generating and outputting a reset signal when the full wave rectified signal has a predetermined reset value.

56. The method of claim 55, wherein the predetermined reset value is 0V.

57. The method of claim 55, wherein:

the pulse width modulated signal is generated based on the selected motor control target value and the counted value; and the counted value is indicative of a number of events occurring since the reset signal.

58. The method of claim 57, further comprising resetting the counted value to a predetermined value in response to the reset signal.

59. The method of claim 55, further comprising:

determining a nominal pulse width based on a selected motor control target value;

inputting a current value for the selected motor control target value; and redetermining the nominal pulse width in response to the reset signal.

60. The method of claim 45, wherein the pulse width modulated signal generating and outputting step comprises:

initializing a first timer with a first timer value;

initializing a second timer with a second timer value;

generating a pulse of the modulated signal having a pulse period based on the first timer value and a pulse width based on the second timer value; and resetting, in response to the first timer counting the first timer value, one of the first timer value to a modified first timer value and the second timer value to a modified second timer value.

61. The method of claim 60, wherein the pulse width modulated signal generating and outputting step further comprises:

counting a number of times the first timer has counted the first timer value; and determining the one of the modified first and second timer values based on the counted number.

62. The method of claim 60, wherein the pulse width modulated signal generating and outputting step further comprises:

detecting a voltage of the full wave rectified signal in response to the first timer counting the first timer value; and determining the one of the modified first and second timer values based on the detected voltage.

63. The method of claim 60, wherein:

the first timer value corresponds to a pulse period of the pulse width modified signal; and the second timer value corresponds to a pulse width of the pulse width modified signal.

64. An apparatus for controllably driving an electric motor powered by an alternating current power supply, the apparatus comprising:

a full wave rectifying circuit which rectifies an alternating current of an alternating electric signal supplied by the alternating current power supply and outputs an initial full wave rectified signal having an initial full wave rectified current that includes a plurality of cyclic waves corresponding to a plurality of half cycles of the alternating electric signal, respectively;

a current supply circuit which applies a pulse width modulated fall wave rectified current to the electric motor by controllably interrupting the supply of each of the cyclic waves of the initial full wave rectified current during an entire interval of each of said cyclic waves to the electric motor based on a pulse width modulation signal, so that the electric motor is supplied with an electric current having a substantially constant magnitude during a substantially entire interval of each of said cyclic waves; and a current supply control circuit which generates and outputs the pulse width modulation signal to the current supply circuit, the current supply control circuit generating the pulse width modulation signal based on a selected motor control target value and a voltage of the initial full wave rectified signal.

65. The apparatus of claim 64, wherein the current supply control circuit determines the voltage of the full wave rectified signal based on a phase of the full wave rectified signal.

66. The apparatus of claim 64, wherein the current supply control circuit includes means for detecting the voltage of the full wave rectified signal.

67. The apparatus of claim 64, wherein the current supply control circuit outputs, as a nominal pulse period for a current pulse of the pulse width modulated signal, a selected one of a plurality of predetermined pulse periods, the selected one of the plurality of predetermined pulse periods selected based on the voltage of the initial full wave rectified signal.

68. The apparatus of claim 64, wherein:

the pulse width modulated signal has a predetermined pulse frequency; and the current supply control circuit determines a nominal pulse width for the pulse width modulated signal based on the selected motor control target value.

69. The apparatus of claim 68, wherein the current supply control circuit modifies the nominal pulse width for a current pulse of the pulse width modulated signal based on a selected one of a plurality of predetermined correction factor values, the selected one of the plurality of predetermined correction factor values selected based on the voltage of the initial full wave rectified signal.

70. The apparatus of claim 67, further comprising a synchronous signal generating circuit connected to the full wave rectifying circuit and generating and outputting a reset signal to the current supply control circuit when the full wave rectified signal has a predetermined reset value.

71. The apparatus of claim 70, wherein the predetermined reset value is 0V.

72. The apparatus of claim 70, wherein the current supply control circuit determines a nominal pulse width based on the selected motor control target value, the current supply control circuit inputting a current value for the selected motor control target value and redetermining the nominal pulse width in response to the reset signal.

73. The apparatus of claim 69, wherein:

the current supply control circuit determines a nominal pulse width for the pulse width modulated signal based on the selected motor control target value; and the current supply control circuit modifies the nominal pulse width for a current pulse of the pulse width modulated signal based on the voltage of the initial full wave rectified signal.

74. The apparatus of claim 73, wherein modified pulse width W is determined as:

$$W=(c/A)*W0$$

where:

W0 is the nominal pulse width;

A is a normalized value of the voltage of the initial full wave rectified signal; and c is a constant.

75. The apparatus of claim 64, wherein:

the current supply control circuit determines a nominal pulse width for the pulse width modulated signal based on the selected motor control target value; and the current supply control circuit selects one of a plurality of predetermined pulse period values based on the voltage of the initial full wave rectified signal as a current pulse period of the pulse width modulated signal.

76. The apparatus of claim 64, wherein:

the current supply control circuit determines a nominal pulse width for the pulse width modulated signal based on the selected motor control target value; and the current supply control circuit determines a modified pulse period for the pulse width modulated signal based on the voltage of the initial full wave rectified signal and a predetermined nominal pulse period.

77. The apparatus of claim 76, wherein the modified pulse period t is determined as:

$$t=(c*A)*t0$$

where:

t0 is the predetermined nominal pulse period;

A is a normalized value of the voltage of the initial full wave rectified signal; and c is a constant.

78. The apparatus of claim 64, wherein the current supply control circuit comprises:

a voltage detector which detects the voltage of the initial full wave rectified signal; and a control device which determines a nominal pulse width for the pulse width modulated signal based on the selected motor control target value.

79. The apparatus of claim 78, wherein the current supply control circuit further comprises:

a pulse-width modifier which determines a modified pulse width by modifying the nominal pulse width determined by the control device based on the voltage of the initial full wave rectified signal detected by the voltage detector; and a pulse signal generator which generates the pulse width modulated signal and outputs the pulse width modulated signal to the current supply circuit, a current pulse of the pulse width modulated signal having a predetermined frequency and the modified pulse width.

80. The apparatus of claim 78, wherein the current supply control circuit further comprises:

a pulse-width modifier which determines a modified pulse period based on the voltage of the initial full wave rectified signal detected by the voltage detector; and a pulse signal generator which generates the pulse width modulated signal and outputs the pulse width modulated signal to the current supply circuit, a current pulse of the pulse width modulated signal having the modified pulse period and the nominal pulse width.

81. The apparatus of claim 78, wherein the current supply control circuit further comprises:

a frequency-modulated pulse signal generator which generates the pulse width modulated signal having the nominal pulse width at a modulated pulse period proportional to the detected voltage of the initial full-wave rectified signal.

82. The apparatus of claim 64, wherein the processor unit calculates the current pulse period value t based on the voltage of the full wave rectified signal and a predetermined pulse period, wherein:

$$t=(c*A)*t0$$

where:

t0 is the predetermined nominal pulse period;

A is a normalized value of the voltage of the full wave rectified signal; and c is a constant.

83. The apparatus of claim 64, wherein the current supply control circuit comprises:

a processor unit;

an alterable memory connected to the processor unit;

an interrupt controller connected to an input of the processor unit;

a input/output device, a first input of the input/output device connected to a data output of the processor unit, a first output of the input/output device connected to a first input of the interrupt controller, a second output of the input/output device connected to a first interrupt input of the interrupt controller, and a third output of the input/output device connected to the current supply circuit;

a first timer, a first input of the first timer connected to a fourth output of the input/output device, a second input of the first timer connected to the second output of the input/output device and a first output of the first timer connected to a second interrupt input of the interrupt controller;

a second timer, a first input of the second timer connected to a second output of the first timer, a second input of the second timer connected to a fifth output of the input/output device and an output of the second timer connected to a second input of the input/output device.

84. The apparatus of claim 83, wherein the processor unit detects the voltage of the initial full wave rectified signal each time a first pulse signal is output from the first timer to the second interrupt input of the interrupt controller.

85. The apparatus of claim 84, wherein:

the first count value is fixed and corresponds to a predetermined pulse period of the pulse width modulated signal; and the processor unit determines a modified pulse width value based on the voltage of the initial full wave rectified signal and the nominal pulse width value, and outputs the modified pulse width value to the input/output device in response to the first pulse signal being input to the second interrupt input of the interrupt controller.

86. The apparatus of claim 85, wherein:

a plurality of correction factors are stored in a memory of the current supply control circuit; and the processor unit selects one of the plurality of correction factors based on the voltage of the initial full wave rectified signal and calculates the modified pulse width value based on the selected correction value and the nominal pulse width value.

87. The apparatus of claim 86, wherein the memory is a ROM.

88. The apparatus of claim 85, wherein the modified pulse width value W is determined as:

$$W=(c/A)*W0$$

where:

W0 is the nominal pulse width value;

A is a normalized value of the detected voltage; and c is a constant.

89. The apparatus of claim 83, wherein the processor unit determines a nominal pulse width value for the pulse width modulated signal based on the selected motor control target value.

90. The apparatus of claim 89, wherein the processor unit determines a modified pulse width value for the pulse width modulated signal based on the nominal pulse width value and the voltage of the initial full wave rectified signal, and outputs the modified pulse width value to the input/output device.

91. The apparatus of claim 90, wherein the modified pulse width value input to the input/output device is output to the second timer and stored by the second timer in response to a first pulse signal output by the first timer on the second output.

92. The apparatus of claim 91, wherein the second timer is triggered to output a second pulse signal by the first pulse signal, the second timer outputting, to the fifth output of the input/output device, the second pulse signal until the second timer counts the modified pulse width value, the input/output device outputting the second pulse signal to the current supply circuit.

93. The apparatus of claim 89, wherein the nominal pulse width value is stored in the alterable memory.

94. The apparatus of claim 89, wherein the first timer is supplied with a first count value corresponding to a period of the pulse width modified signal, the first timer outputting a first pulse signal to the second interrupt input of the interrupt controller and the first input of the second timer each time the first timer counts the first count value.

95. The apparatus of claim 94, wherein the first count value is fixed and corresponds to a predetermined pulse period of the pulse width modulated signal.

96. The apparatus of claim 89, wherein the processor unit determines a current pulse period value based on the voltage of the initial full wave rectified signal and outputs the current pulse period value to the input/output device in response to a first pulse signal output by the first timer being input to the second interrupt input of the interrupt controller.

97. The apparatus of claim 96, wherein the current pulse period value input to the input/output device is output to the first timer and stored by the first timer as the first count value in response to the first pulse signal being output by the first timer.

98. The apparatus of claim 97, wherein the nominal pulse width value is output to the input/output device in response to a signal input to the first interrupt input of the interrupt controller, the nominal pulse width value output from the input/output device to the second timer and stored in the second timer.

99. The apparatus of claim 98, wherein the second timer is triggered to output a second pulse signal by the first pulse signal, the second timer outputting the second pulse signal until it counts the nominal pulse width value.

100. The apparatus of claim 96, wherein:
a plurality of pulse period values are stored in a memory of the current supply control circuit; and
the processor unit selects one of the plurality of pulse period values as the current pulse period value based on the voltage of the initial full wave rectified signal.

101. The apparatus of claim 100, wherein the memory is a ROM.

102. The apparatus of claim 22, wherein the processor unit detects the full wave rectified voltage each time a first pulse signal is output from the first timer to the second interrupt input of the interrupt controller.

103. The apparatus of claim 83, further comprising a synchronous signal generating circuit connected to the full wave rectifying circuit and generating a reset signal when the voltage of the initial full wave rectified signal has a predetermined reset value, the synchronous signal generating circuit outputting the reset signal to a third input of the input/output device.

* * * * *